US011112987B2

(12) United States Patent
Gonczi et al.

(10) Patent No.: US 11,112,987 B2
(45) Date of Patent: Sep. 7, 2021

(54) OPTMIZING DATA DEDUPLICATION

(71) Applicant: EMC IP Holding Company LLC, Hopkinton, MA (US)

(72) Inventors: Istvan Gonczi, Berkley, MA (US); Philippe Armangau, Acton, MA (US); Sorin Faibish, Newton, MA (US); Ivan Bassov, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 292 days.

(21) Appl. No.: 16/392,913

(22) Filed: Apr. 24, 2019

(65) Prior Publication Data
US 2020/0341671 A1   Oct. 29, 2020

(51) Int. Cl.
*G06F 3/06* (2006.01)

(52) U.S. Cl.
CPC .......... *G06F 3/0644* (2013.01); *G06F 3/0608* (2013.01); *G06F 3/0641* (2013.01); *G06F 3/0653* (2013.01); *G06F 3/0689* (2013.01)

(58) Field of Classification Search
CPC .... G06F 3/0644; G06F 3/0641; G06F 3/0689; G06F 3/0653; G06F 3/0608; G06F 3/067
See application file for complete search history.

(56) References Cited

U.S. PATENT DOCUMENTS

2013/0013880 A1\* 1/2013 Tashiro ................... H03M 7/30
711/170

OTHER PUBLICATIONS

Aronovich, Lior, et al. "The design of a similarity based deduplication system." Proceedings of SYSTOR 2009: The Israeli Experimental Systems Conference. (Year: 2009).\*
Kim, Taejin & Kim, Jihong & Lee, Sungjin, FineDedup: A Fine-grained Deduplication Technique for Extending Lifetime of Flash-based SSDs, Journal of Semiconductor Technology and Science. 17. 648-659. (Year: 2017).\*
Sorin Faibish, "Elastically Managing Cache for Sub-Block Deduplication," U.S. Appl. No. 16/176,703, filed Nov. 15, 2018.
Philippe Armangau, "Deduplicating Data at Sub-Block Granularity," U.S. Appl. No. 16/176,729, filed Nov. 15, 2018.

\* cited by examiner

*Primary Examiner* — Ramon A. Mercado
(74) *Attorney, Agent, or Firm* — Muirhead and Saturnelli, LLC

(57) ABSTRACT

Techniques for processing data may include: receiving a candidate block; performing partial deduplication processing of the candidate block; receiving a second candidate block subsequent to performing partial deduplication processing for the candidate block; and performing first processing to determine whether to perform promotion processing for the entry, The partial deduplication processing may include: partially deduplicating at least one sub-block of the candidate block; and creating an entry in a deduplication database for the candidate block, wherein the entry includes a digest of the candidate block and the entry denotes a potential target block having the digest, and wherein the entry includes a counter that tracks a number of missed full block deduplications between the potential target block and subsequently processed candidate blocks. The promotion processing promotes the potential target block, having the first digest of the entry, to a new target block.

20 Claims, 21 Drawing Sheets

1300

| Digest 1302 | Digest key type 1304 | Reference (Ref) 1306 | Counter 1308 |
|---|---|---|---|
| D1 | L | Ref1 (1202) | -- |
| D2 | R | Ref1 (1202) | -- |
| D3 | F non-speculative | Ref1 (1202) | -- |

1310 → D1 row
1312 → D2 row
1314 → D3 row

| Digest 1302 | Digest key type 1304 | Reference (Ref) 1306 | Counter 1308 |
|---|---|---|---|
| 1310 D1 | L | Ref1 (1202) | -- |
| 1312 D2 | R | Ref1 (1202) | -- |
| 1314 D3 | F non-speculative | Ref1 (1202) | -- |
| 1316 D4 | F speculative | Null | 0 |

| Digest 1302 | Digest key type 1304 | Reference (Ref) 1306 | Counter 1308 |
|---|---|---|---|
| D1 | L | Ref1 (1202) | -- |
| D2 | R | Ref1 (1202) | -- |
| D3 | F non-speculative | Ref1 (1202) | -- |
| D4 | F speculative | Null | 1 |

1310 — D1 row
1312 — D2 row
1314 — D3 row
1316 — D4 row
1402 — Counter value 1

| Digest 1302 | Digest key type 1304 | Reference (Ref) 1306 | Counter 1308 |
|---|---|---|---|
| 1310 D1 | L | Ref1 (1202) | -- |
| 1312 D2 | R | Ref1 (1202) | -- |
| 1314 D3 | F non-speculative | Ref1 (1202) | -- |
| 1316 D4 | F speculative | Null | 2 — 1502 |

FIG. 15

| Digest 1302 | Digest key type 1304 | Reference (Ref) 1306 | Counter 1308 |
|---|---|---|---|
| D1 | L | Ref1 (1202) | -- |
| D2 | R | Ref1 (1202) | -- |
| D3 | F non-speculative | Ref1 (1202) | -- |
| D4 | F non-speculative | Ref4 (1208) | -- |
| D5 | L | Ref4 (1208) | -- |
| D6 | R | Ref4 (1208) | -- |

FIG. 16

OPTMIZING DATA DEDUPLICATION

BACKGROUND

Technical Field

This application generally relates to data storage and, more particularly, data deduplication techniques.

Description of Related Art

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some storage systems support data "deduplication." A common deduplication scheme involves replacing redundant copies of a data block with pointers to a single retained copy. Data deduplication may operate in the background, after redundant data blocks have been stored, and/or operate inline with storage requests. Inline deduplication matches newly arriving data blocks with previously stored data blocks and configures pointers accordingly, thus avoiding initial storage of redundant copies.

A common deduplication scheme involves computing digests of data blocks and storing the digests in a database. Each digest is computed as a hash of a data block's contents and identifies the data block with a high level of uniqueness, even though the digest is typically much smaller than the data block itself. Digests thus enable block matching to proceed quickly and efficiently, without having to compare blocks directly. For each digest, the database stores a pointer that leads to a stored version of the respective data block. To perform deduplication on a particular candidate block, a storage system computes a digest of the candidate block and searches the database for an entry that matches the computed digest. If a match is found, the storage system arranges metadata of the candidate block to point to the data block that the database has associated with the matching digest. In this manner, a duplicate copy of the data block is avoided.

SUMMARY OF THE INVENTION

Embodiments using the techniques herein may include a method, system, and computer readable medium for processing data. A first candidate block, including a plurality of uniformly-sized sub-blocks, is received. Partial deduplication processing is performed for the first candidate block, wherein the partial deduplication processing includes: partially deduplicating at least one sub-block of the first candidate block; and creating a first entry in a deduplication database for the first candidate block, wherein the first entry includes a first digest of the first candidate block and the first entry denotes a potential target block having the first digest, and wherein the first entry includes a counter that tracks a number of missed full block deduplications between the potential target block and subsequently processed candidate blocks. A second candidate block is received subsequent to performing partial deduplication processing for the first candidate block. First processing is performed to determine whether to perform promotion processing for the first entry, wherein the promotion processing promotes the potential target block, having the first digest of the first entry, to a new target block. The processing may include determining whether a second digest of the second candidate block matches the first digest of the first entry; and responsive to determining the second digest of the second candidate block matches the first digest of the first entry, incrementing the counter of the first entry. The first processing may include determining whether the counter of the first entry is less than a specified threshold; and responsive to determining the counter of the first entry is not less than the specified threshold, performing said promotion processing for the first entry. The counter of the first entry may not be less than the specified threshold and promotion processing may be performed for the first entry. The promotion processing for the first entry may include storing a data block having the first digest on persistent storage; and updating a reference field of the first entry to identify a location including content of the data block. The location may be in a cache. The location may be in the persistent storage. The processing may include: receiving a third candidate block; and performing data deduplication processing for the third candidate block including: determining that the third candidate block is a duplicate of the data block having the first digest of the first entry; and storing the third candidate block as a duplicate of the data block having the first digest of the first entry. The data deduplication processing for the third candidate block may include computing a third digest for the third candidate block; comparing the third digest to the first digest of the first entry; and determining that the third digest matches the first digest. The processing may include performing a comparison of data content of the third candidate block and data content of the data block having the first digest of the first entry. The second digest of the second candidate block may match the first digest of the first entry and the processing may include performing full block deduplication on the second candidate block where the second candidate block is stored as a duplicate of the data block having the first digest of the first entry. The processing may be performed as part of inline processing of data blocks, including the first and second candidate blocks, in connection with an I/O path or data path when servicing one or more I/Os accessing the one or more data blocks. The processing may be performed offline and not performed as part of inline processing of data blocks, including the first and second candidate blocks, in connection with an I/O path or data path when servicing one or more I/Os accessing the one or more data blocks.

BRIEF DESCRIPTION OF THE DRAWINGS

Features and advantages of the present invention will become more apparent from the following detailed description of exemplary embodiments thereof taken in conjunction with the accompanying drawings in which:

FIGS. 12, 13A, 13B, 14A, 14B, 15, 16, 17 and 18 are examples illustrating use of the techniques herein in a particular embodiment.

DETAILED DESCRIPTION OF EMBODIMENT(S)

Unfortunately, conventional deduplication schemes fail to detect redundant data when blocks are similar but not identical. For example, a data storage system might store multiple copies of a given block, which are nearly identical except for a timestamp or label, which is unique to each copy. Owing to the randomizing nature of the hash function, digests computed from the slightly different copies of the data block differ widely from one another, such that deduplication is unable to detect the redundant content. Many opportunities to improve storage efficiency are therefore missed.

In contrast with the prior approach, an improved technique for performing data deduplication operates at sub-block granularity by searching a deduplication database for a match between a candidate sub-block of a candidate block and a target sub-block of a previously-stored target block. When a match is found, the technique identifies a duplicate range shared between the candidate block and the target block and effects persistent storage of the duplicate range by configuring mapping metadata of the candidate block so that it points to the duplicate range in the target block.

Advantageously, improved techniques described herein avoid redundant storage of identical portions of data blocks, even when the data blocks as a whole are different. Storage efficiency is thereby improved.

It should be appreciated that embodiments are provided by way of non-limiting examples to illustrate certain features and principles of the techniques described herein. However, techniques herein are not limited to the particular embodiments described.

Described herein are improved techniques for performing data deduplication that may operate at sub-block granularity by searching a deduplication database for a match between a candidate sub-block of a candidate block and a target sub-block of a previously-stored target block. When a match is found, the technique identifies a duplicate range shared between the candidate block and the target block and effects persistent storage of the duplicate range by configuring mapping metadata of the candidate block so that it points to the duplicate range in the target block.

Figure 1:
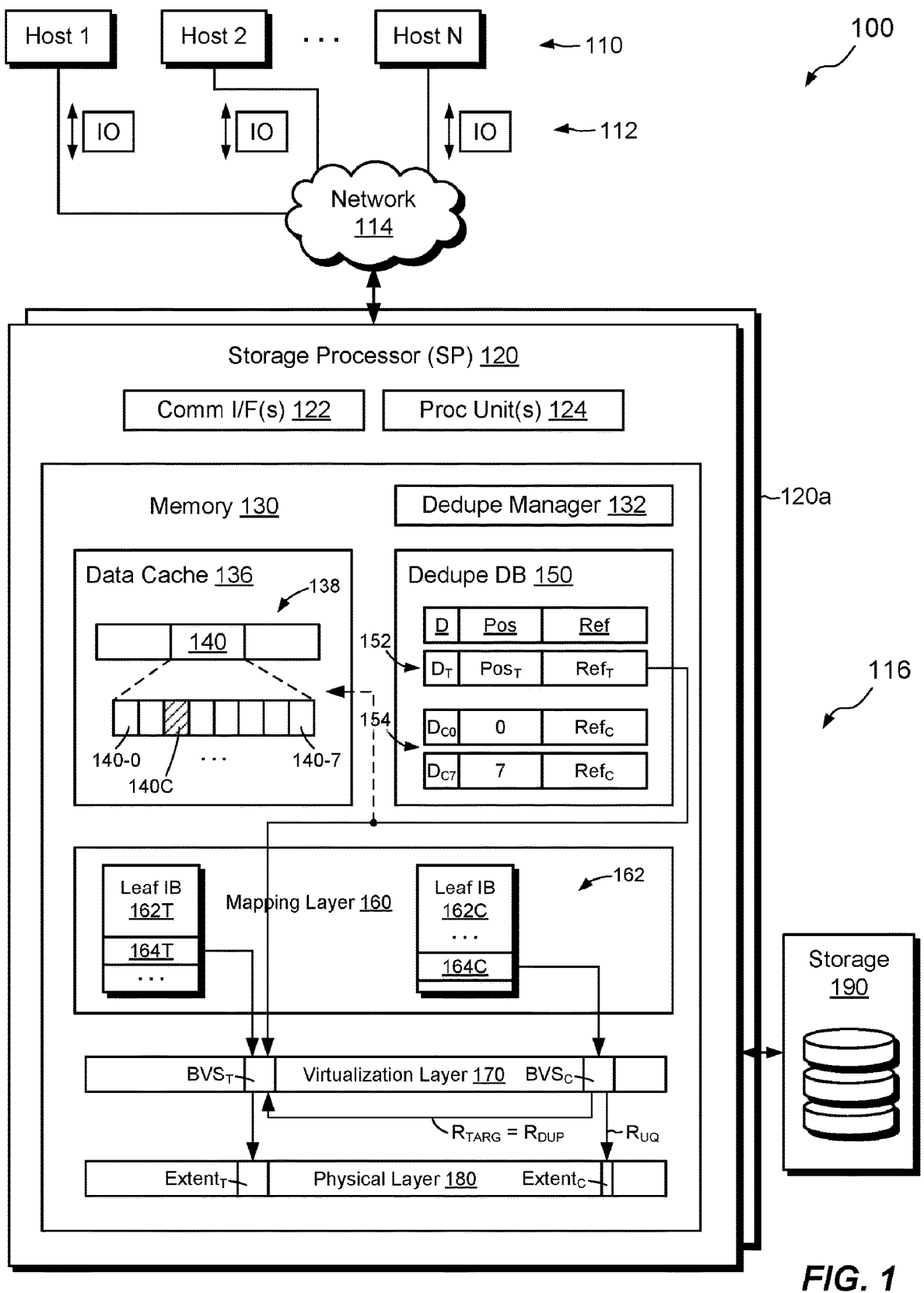
FIG. 1 is a block diagram of an example environment in which embodiments of the improved technique can be practiced.

FIG. 1 shows an example environment 100 in which embodiments of the improved techniques herein can be practiced. Here, multiple hosts 110 access a data storage system 116 over a network 114. The data storage system 116 includes a storage processor, or "SP," 120 and storage 190, such as magnetic disk drives, electronic flash drives, and/or the like. The data storage system 116 may include multiple SPs (e.g., a second SP 120a). For example, multiple SPs may be provided as circuit board assemblies or blades, which plug into a chassis that encloses and cools the SPs. The chassis has a backplane for interconnecting the SPs, and additional connections may be made among SPs using cables. In some examples, the SP 120 is part of a storage cluster, such as one which contains any number of storage appliances, where each appliance includes a pair of SPs connected to shared storage devices. In some arrangements, a host application runs directly on the SP (or SPs), such that separate host machines 110 need not be present. No particular hardware configuration is required, however, as any number of SPs may be provided, including a single SP, in any arrangement, and the SP 120 can be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the SP 120 using various technologies, such as Fibre Channel, iSCSI (Internet small computer system interface), NFS (network file system), and CIFS (common Internet file system), for example. As is known, Fibre Channel and iSCSI are block-based protocols, whereas NFS and CIFS are file-based protocols. The SP 120 is configured to receive I/O requests 112 according to block-based and/or file-based protocols and to respond to such I/O requests 112 by reading or writing the storage 190.

The SP 120 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the SP 120. The set of processing units 124 includes one or more processing chips and/or assemblies, such as numerous multi-core CPUs. The memory 130 includes both volatile memory, e.g., Random Access Memory (RAM), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a data cache 136, a deduplication ("dedupe") manager 132, a deduplication database 150, a mapping layer 160, a virtualization layer 170, and a physical layer 180. The dedupe manager 132 is configured to manage deduplication activities. The data cache 136 may be realized in volatile memory (e.g., RAM) and is configured to store temporarily incoming data arriving from hosts 110. The data cache 136 may also store recently-written and/or read data blocks, to support deduplication. In an example, the data cache 136 defines incoming data 138 from hosts 110 in the form of blocks (such as block 140), where each block is composed of a sequence of sub-blocks (e.g., sub-blocks 140-0 through 140-7). As is known, a "block" is a unit of storage in a data storage system, which generally corresponds to the smallest unit of storage space that can be allocated. Block sizes vary from one storage system to the next, with typical sizes being 4 kB (kilobytes) or 8 kB, for example. In the particular arrangement shown, there are eight sub-blocks per block, and the sub-blocks are contiguous and uniform in size. For example, if the block size is 4 kB, each sub-block would be 512 B, which corresponds to one sector.

The dedupe database 150 is configured to store digests of sub-blocks along with associated information. For example, the dedupe database 150 stores, for each of multiple sub-blocks, a digest "D" of that sub-block and a reference ("Ref") to a location, in the data storage system 116, of a data block that contained the respective sub-block when the database entry was made. The SP 120 computes each digest as a hash of the respective sub-block's contents. Thus, different sub-blocks produce different digests, with rare hash collisions being possible. The reference Ref may take various forms. For example, Ref may point to a memory location in the data cache 136 where the data block is temporarily being held. Alternatively, Ref may point to metadata (e.g., a block virtualization structure) that maps to the data block, such that a persisted version of the data block may be obtained by following the reference to the pointed-to metadata. In some examples, the reference points directly to the data block, e.g., in the physical layer 180. An entry in the dedupe database 150 may further include a sub-block position, "Pos," which indicates a position of the sub-block for that entry in the referenced data block. For example, if the sub-block for a database entry was the first sub-block in the data block that contained it, then the position Pos might be 0. If the sub-block was the last sub-block in the data block, then the position Pos might be 7. In some examples, entries in the dedupe database 150 are created only for first and last sub-blocks of their parent data blocks, such that there are only two possibilities and Pos may be represented with a single bit. In some examples, sub-block position may be tracked using a separate bitmap. The bitmap may be arranged by sub-block and may provide a single bit for each sub-block, to indicate whether the respective sub-block is in the first position or in the last position.

The dedupe database 150 may operate as a memory-resident cache. The cache may utilize an LRU (least-recently used) eviction policy. In some examples, when evicting an entry from the dedupe database 150, the SP 120 also evicts the data block referenced by that entry in the data cache 136. In some cases, the dedupe database 150 is backed by persistent storage, with portions read into volatile memory as needed for fast access.

The mapping layer 160 includes metadata for mapping blocks of data objects, such as LUNs (Logical UNits), file systems, virtual machine disks, and/or the like, which may be managed by a separate namespace layer (not shown). The mapping layer 160 maps each data object to a corresponding set of block virtualization structures ("BVSs") in the virtualization layer 170. In some examples, one BVS is provided for each addressable data block in the storage system. The mapping layer 160 includes indirect blocks ("IBs") 162. Each IB 162 is a block that contains an array of block pointers, such as 1024 block pointers. In an example, IBs 162 are arranged in a tree, or in multiple trees, in which block pointers in parent IBs point to child Ms and thus multiply the total number of BVSs (and therefore data blocks) that can be addressed.

In the virtualization layer 170, the BVSs enable the data storage system 116 to deduplicate physical data blocks and to relocate physical data blocks without having to update block pointers in the mapping layer 160. Block pointer updates would be a very burdensome task, given that block pointers tend to be much more numerous and widely dispersed than are BVSs.

The physical layer 180 manages the physical data blocks of the data storage system 116. For example, the physical layer 180 is denominated in data blocks of uniform size, such as 4 kB, 8 kB, or the like. Each data block is uniquely addressable.

The physical layer 180 is configured to store host data as storage extents in the data blocks. The extents may hold compressed data or uncompressed data. Some extents may be smaller than a block, e.g., if the data are compressed and/or if only a portion of a block's data are uniquely stored. One should appreciate that the physical layer 180 is itself a logical structure and that the bits of data are actually stored in devices of the storage 190. The data storage system 116 may include additional layers, which are not shown, such as a RAID (Redundant Array of Independent (or Inexpensive) Disks) layer, additional mapping layers, and the like. The depicted arrangement is intended merely to be illustrative.

In example operation, the hosts 110 issue I/O requests 112 to the data storage system 116. The SP 120 receives the I/O requests 112 at the communication interfaces 122 and initiates further processing. For example, the SP 120 receives sets of incoming data 138 being written by hosts 110 and renders the data in block-sized increments of memory, referred to herein simply as "blocks." The data as received from the hosts is not necessarily block-denominated and may arrive in I/O's of any size. Nevertheless, the data cache 136 may store the arriving data as blocks, which the data cache 136 may realize in buffer caches, for example. The size of the buffer caches is preferably configured to match the block size of the data storage system 116.

To support sub-block data deduplication, the SP 120 defines multiple sub-blocks for the defined blocks. For example, the SP 120 renders block 140 as sub-blocks 140-0 through 140-7, which are contiguous and uniformly sized. The inventors have recognized that a sub-block size of 512 B (one sector) is particularly well-suited for sub-block deduplication, as many host applications use the sector as a standard size for performing writes. Although host applications may shift data when writing to the data storage system 116, such shifts tend to appear in full-sector increments. Performing deduplication at per-sector granularity thus catches many shifted sectors that conventional, block-based deduplication would miss. Setting the sub-block size to something different from a sector is not excluded from processing described herein.

With the sub-blocks 140-0 through 140-7 defined, a deduplication attempt begins by attempting to match one or more the sub-blocks to an entry in the dedupe database 150. For example, the dedupe manager 132 receives a candidate sub-block 140C of the candidate block 140 and generates a digest of the candidate sub-block 140C, e.g., by applying a hash function to the contents of sub-block 140C. The dedupe manager 132 then searches the dedupe database 150 for a digest D that matches the computed digest of sub-block 140C. In a non-limiting example, the dedupe database 150 is constructed as a key-value store, where the digest D forms the key and the reference Ref and position Pos form the value. In such cases, searching for a matching entry in the dedupe database 150 merely entails looking up the value that corresponds to the digest which is applied as the key. If no match is found, the dedupe manager 132 may try a different sub-block of candidate block 140. If no match is found after attempting all sub-blocks 140-0 through 140-7, then the deduplication attempt fails for the candidate block 140. The SP 120 may then allocate a new storage extent from the physical layer 180 and store the contents of the candidate block 140 in the newly allocated extent.

If the dedupe manager 132 succeeds, however, in finding a matching entry 152 to the candidate sub-block 140C, then deduplication proceeds. In an example, the matching entry 152 is the entry in the dedupe database 150 for which the digest DT matches the computed digest of the candidate sub-block 140C. The digest DT itself was computed for an earlier processed sub-block, which we refer to as a "target sub-block," and was part of an earlier-processed data block, which we refer to as a "target block."

The dedupe manager 132 then follows the reference RefT in the matching entry to obtain the target block, which may still reside in the data cache 136 or which may be fetched from storage 190 if it does not. Depending on implementation, the deduplication attempt may fail if there is a cache miss, as fetching the target block from disk may be too time-consuming to be warranted.

Assuming the target block is obtained, the dedupe manager 132 may proceed by confirming the match. For example, the dedupe manager 132 compares the candidate sub-block 140C with the target sub-block as read from the target block and tests whether the two are the same, e.g., by performing a data comparison. Note that the matching entry 152 indicates, via $Pos_T$, the position of the target sub-block in the target block. Thus, the comparison may proceed without having to scan the entire target block.

Assuming the match is confirmed, the dedupe manager 132 may identify the full extent of the match. For example, a match to the target sub-block may be part of a larger match between the candidate block 140 and the target block. Given the position, $Pos_T$, of the target sub-block in the target block, the dedupe manager 132 selects a direction in which to search for an extended match. For instance, if the target sub-block was the first block in the target block, then the search should proceed in the forward direction. But if the target sub-block was the last block in the target block, the search should proceed in the reverse direction. The dedupe manager 132 proceeds in the indicated direction, comparing bytes of the candidate block 140 with corresponding bytes of the target block, until an end of the candidate block 140 is reached or until the bytes of the two blocks no longer match. The dedupe manager 132 then identifies a boundary between a duplicate range of the candidate block, $R_{DUP}$, which is shared with a target range $R_{TARG}$ of the target block, and a unique range of the candidate block $R_{UQ}$, which is unique to the candidate block 140. Some block comparisons may yield two unique ranges, one before the duplicate range $R_{DUP}$ and one after.

Next, the dedupe manager 132 effects persistent storage of the candidate block 140, in a manner that efficiently accounts for both the duplicate range $R_{DUP}$ and the unique range $R_{UQ}$ (or unique ranges). In the example shown, the data storage system 116 has already stored the target block, along with metadata to support it. For example, SP 120 already configured a block pointer 164T in a leaf IB 162T in the mapping layer 160. The block pointer 164T is already configured to point to $BVS_T$ in the virtualization layer 170. $BVS_T$ in turn points to $Extent_T$, which stores the target block in the physical layer 180. Now, to support storage of the candidate block 140, the mapping layer 160 configures a block pointer 164C in leaf IB 162C. The block pointer 164C points to BVSc, which is made to point to two different locations. The first location is the address of $Extent_C$, which is designated for storing the unique range (or ranges), $R_{UQ}$, of the candidate block. The second location is the address of $BVS_T$, i.e., the BVS that points to the target block and contains the duplicate range, $R_{DUP}$. When pointing to $BVS_T$, the metadata in $BVS_C$ may specify the range $R_{TARG}$ of the target block that contains the shared data, such as by offset and length. The SP 120 may then store the unique range $R_{UQ}$ in $Extent_C$. The stored data may be compressed, if desired.

The described operations thus effect storage of the candidate block 140 while consuming only the amount of storage space required to support the unique range, $R_{UQ}$, which may be as small as a single sector, or smaller if compressed. Some additional metadata may be needed, but the additional metadata is small compared with the amount of storage space conserved. In a conventional, block-based deduplication scheme, the unique range $R_{UQ}$ would have precluded any match to a previous block, so the entire block would have to have been stored, which would have been up to eight times the amount of data that is stored in the current example.

One significant feature of the described technique is that it combines digest-based lookups of sub-blocks with data comparisons of data. In some circumstances, this arrangement allows data to be deduplicated at levels even smaller than the size of a sub-block. For example, when comparing the candidate block 140 with the target block, the dedupe manager 132 may operate with arbitrarily high precision. Thus, the dedupe manager 132 can identify boundaries between duplicate ranges and unique ranges with precision as high as a single byte.

Because the described technique uses data comparisons as part of its processing, the act of confirming that there are no hash collisions is a simple matter, as the target block and candidate block are already being compared. Some embodiments leverage this feature by using relatively small digests in the dedupe database 150, such as digests having fewer than 128 bits. Although long digests can reduce the risk of hash collisions to nearly zero, they are complex to compute and can place high burdens on processor cores. As the disclosed technique compares the blocks as part of its regular processing, the technique is tolerant to hash collisions. Should a hash collision (false positive match) occur, the collision will be detected by data comparison and treated as a non-match. In such cases, the dedupe manager 132 can simply try again or move on to the next sub-block of the candidate block, attempting to match that one.

Also, one of ordinary skill in the art will appreciate that sub-block deduplication is also capable of matching entire blocks. For instance, if a data comparison of a candidate block to a target block results in a duplicate range $R_{OUP}$ the size of the entire block, with a unique range $R_{UQ}$ of zero size, then the entire block is matched and no unique range needs to be stored.

One might observe that sub-block duplication generally requires a greater number of digest lookups than does block-based deduplication. However, the use of smaller digests can help to offset the increased number of lookups. Also, implementations may limit the cost of lookups where no match is found by using Bloom filters, for example.

Although data comparisons are the general rule, it can be avoided in some circumstances. For instance, if the candidate sub-block is in the first position of the candidate block (like sub-block 140-0), and the position indicator $Pos_T$ of the matching entry 152 indicates the last position in the target block, then the match cannot be extended as there is no possibility of there being additional shared content. The match would thus be limited to the matching sub-block, and a data comparison is avoided.

The dedupe manager 132 may also play a role in loading the dedupe database 150 with new content. For instance, as the data cache 136 receives new host data and defines new blocks, the dedupe manager 132 may access those blocks and create new database entries for one or more of their sub-blocks. Creating new entries for all sub-blocks of each newly defined block is certainly an option, but we have recognized that it is generally sufficient to create entries for only the first and the last sub-blocks, e.g., 140-0 and 140-7. In the example shown, the dedupe manager 132 has created new database entries for sub-blocks 140-0 and 140-7. Each entry includes a digest hash of the respective sub-block ($D_{C0}$ or $D_{C7}$), a position (0 or 7) of the respective sub-block in the candidate block 140, and a reference Refc to the candidate block 140, which may be a pointer to the buffer cache that stores the candidate block 140 in the data cache 136.

A rationale behind limiting new database entries to first and last sub-blocks is that data shifts (by sector increments) may be common, but data inserts may be expected to be relatively rare. Recording entries for the first and last sub-blocks ensures that shifted data will produce at least one sub-block match. In some cases, new sub-block entries are avoided for sub-blocks that are already recorded in entries of the dedupe database 150.

Figure 2A:
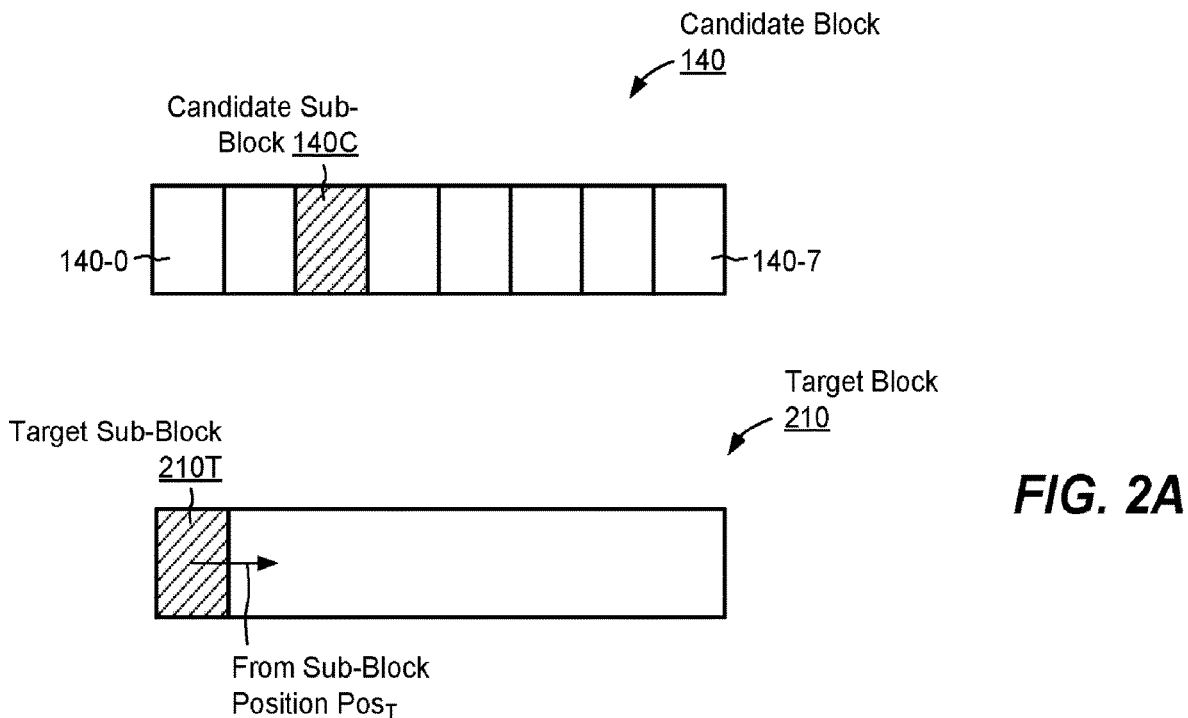
FIGS. 2A and 2B are diagrams that show an example sequence for identifying a duplicate range and a unique range of a candidate block when a candidate sub-block has matched to a target sub-block that occupies a first position of a target block.
Figure 2B:
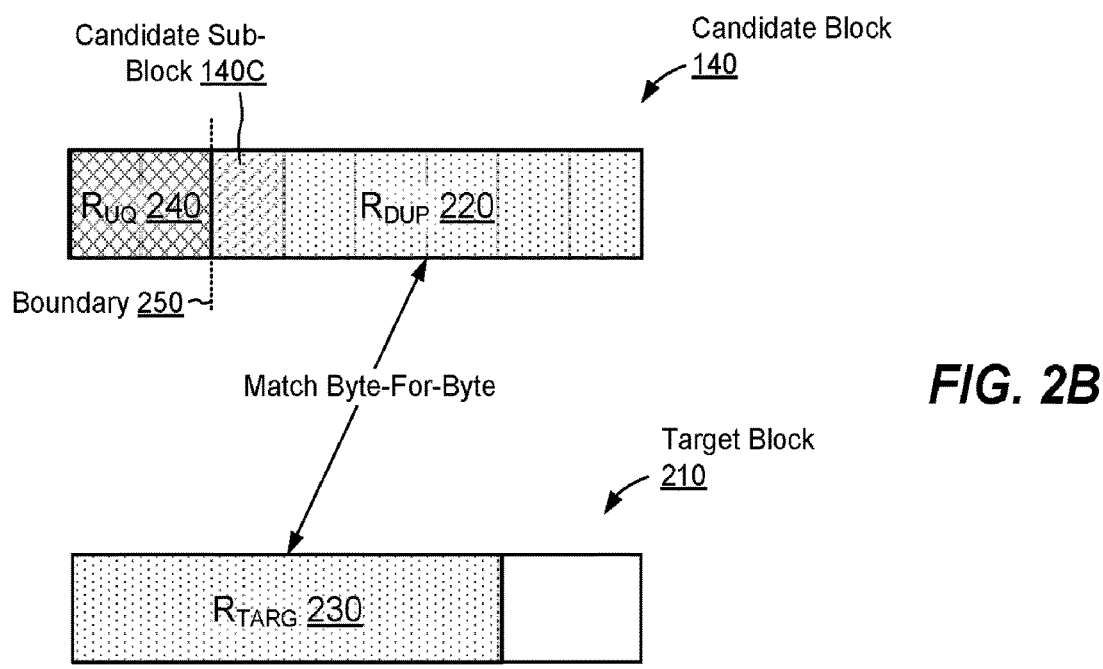

Referring to FIGS. 2A and 2B, shown is an example sequence for deduplicating a portion of candidate block 140 when candidate sub-block 140C has been matched to a target sub-block 210T in a first position of a target block 210. As shown in FIG. 2A, the value of $Pos_T$ in the matching entry 152 has identified the target sub-block 210T as being in the first position of the target block 210, which indicates a forward search direction through the candidate block 140. The dedupe manager 132 proceeds to search in the forward direction through the candidate block, starting with the candidate sub-block 140C (or the forward end of it, e.g., if a hash collision has been ruled out). As the dedupe manager 132 advances through the candidate block 140, it advances correspondingly through the target block 210, comparing data of the candidate block 140 with data of the target block 210 at a level of granularity smaller than the size of a sub-block. For instance, comparisons may proceed in 16-byte chunks, in 8-byte chunks, in 1-byte chunks, or in any-sized chunks are best suited to the implementation.

At some point, the dedupe manager 132 either detects a mismatch or reaches the forward end of the candidate block 140. In this example, no mismatch is detected and, as shown in FIG. 2B, the dedupe manager 132 identifies a duplicate range $R_{DUP}$ 220 in the candidate block 140 and a corresponding target range $R_{TARG}$ 230 in the target block 210. These ranges match byte-for-byte and are exact duplicates of each other. The dedupe manager 132 also identifies a unique range, $R_{UQ}$ 240, of the candidate block, which does not correspond to any content in the target block 210. A boundary 250 may be identified between the duplicate range $R_{DUP}$ 220 and the unique range $R_{UQ}$ 240. In this case, the boundary 250 aligns with a sub-block boundary, i.e., between sub-blocks 140-1 and 140-2. The dedupe manager 132 then proceeds as already described, by arranging mapping metadata to effect storage of the duplicate range $R_{DUP}$ (by reference to the range $R_{TARG}$ in the target block) and by directing storage of the unique range $R_{UQ}$ in a storage extent in the physical layer 180. This example thus avoids redundant storage of $R_{DUP}$ and saves three quarters of a block.

Figure 3A:
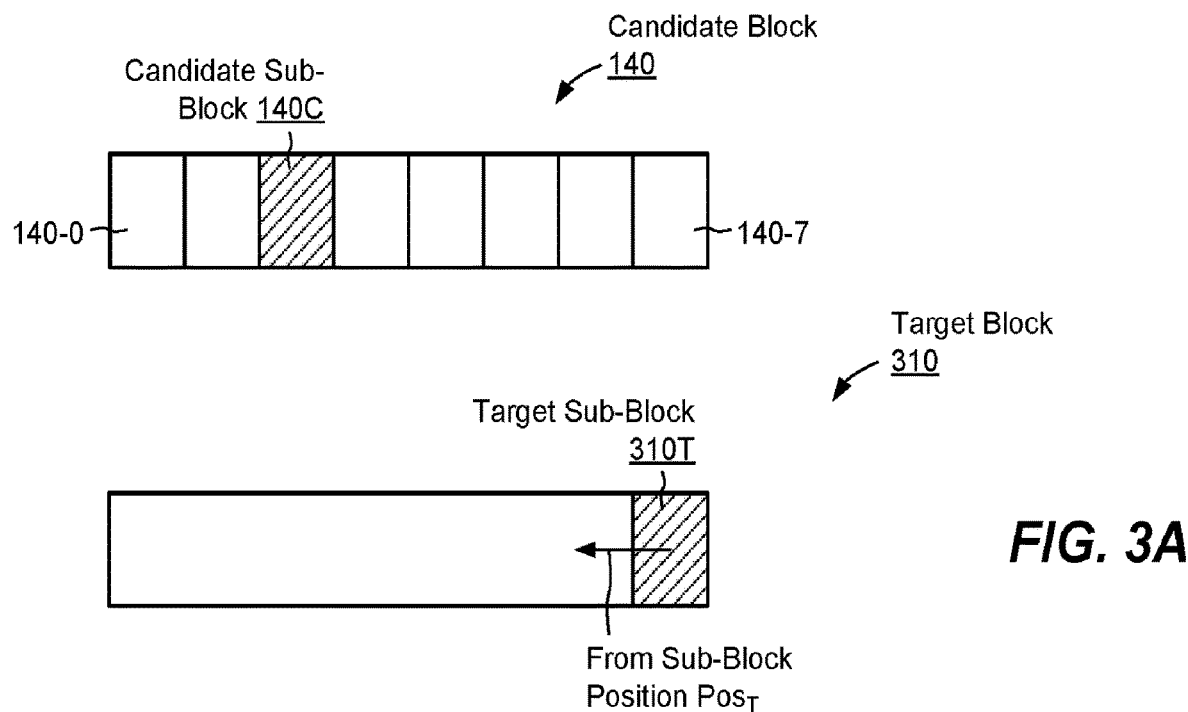
FIGS. 3A and 3B are diagrams that show an example sequence for identifying a duplicate range and a unique range of a candidate block when a candidate sub-block has matched to a target sub-block that occupies a last position of a target block.
Figure 3B:
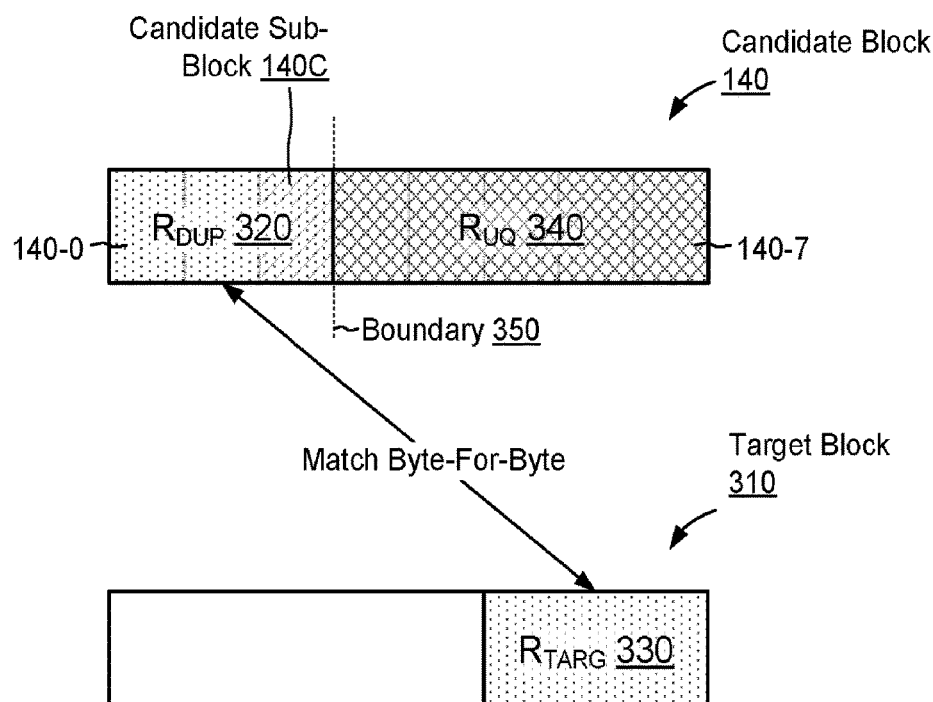

Referring to FIGS. 3A and 3B, shown is an example sequence for deduplicating a portion of candidate block 140 when candidate sub-block 140C has been matched to a target sub-block 310T in a last position of a target block 310. As shown in FIG. 3A, the value of $Pos_T$ in the matching entry 152 has identified the target sub-block 310T as being in the last position of the target block 310, which indicates a reverse search direction through the candidate block 140. The dedupe manager 132 proceeds to search in the reverse direction through the candidate block, starting with the candidate sub-block 140C (or the back end of it). As the dedupe manager 132 retracts through the candidate block 140, it retracts correspondingly through the target block 310, comparing data of the candidate block 140 with data of the target block 310 at fine granularity. In this example, no mismatch is detected and, as shown in FIG. 3B, the dedupe manager 132 identifies a duplicate range $R_{DUP}$ 320 in the candidate block 140 and a corresponding target range $R_{TARG}$ 330 in the target block 310. The dedupe manager 132 also identifies a unique range, $R_{UQ}$ 340, of the candidate block 140, which does not correspond to any content in the target block 310. A boundary 350 may also be identified between the duplicate range $R_{DUP}$ 320 and the unique range $R_{UQ}$ 340. In this case, the boundary 350 aligns with a sub-block boundary, i.e., between sub-blocks 140-2 and 140-3. The process then proceeds as described above, by arranging mapping metadata to effect storage of the duplicate range $R_{DUP}$ and by directing storage of the unique range $R_{UQ}$ in the physical layer 180. This example saves three eighths of a block.

Figure 4A:
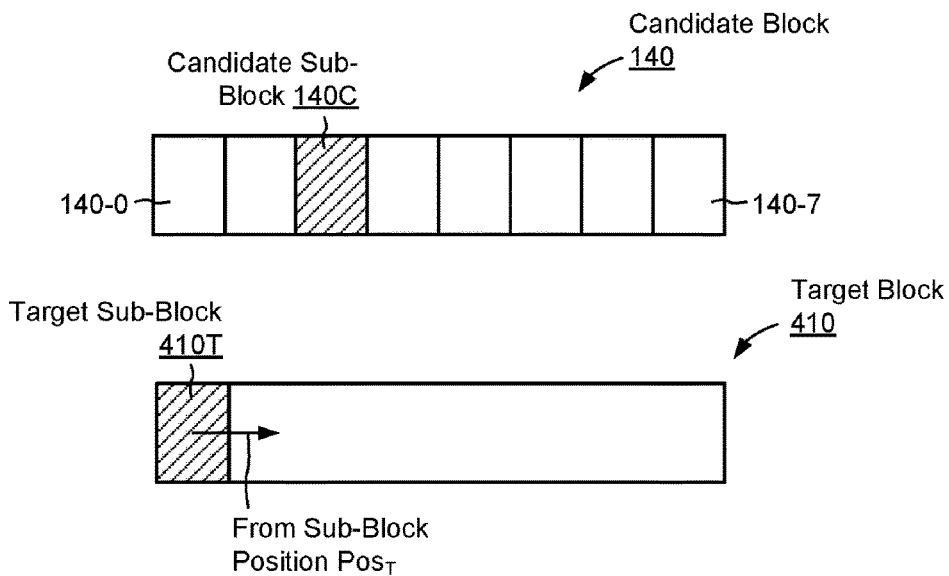
FIGS. 4A, 4B and 4C are diagrams that show an example sequence for identifying a duplicate range and two discontiguous unique ranges of a candidate block when the duplicate range does not extend all the way to an end of the candidate block.
Figure 4B:
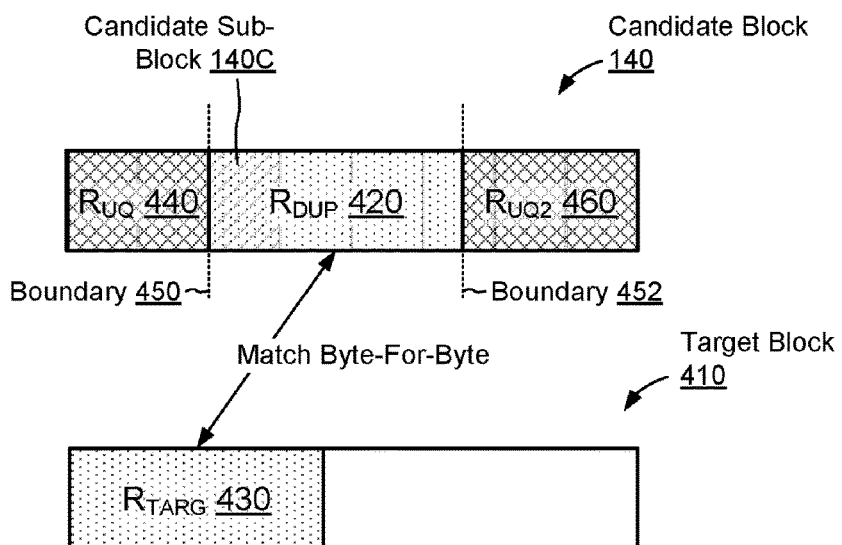

Referring to FIGS. 4A and 4B, shown is a slightly more complex example. As in FIG. 2A, the candidate sub-block 140C has been matched to a target sub-block 410T in a first position of a target block 410. But here, the comparison between candidate block 140 and target block 410 has yielded a mismatch. Rather than extending all the way to the end of the candidate block 140, as in FIG. 2B, the duplicate range $R_{DUP}$ 420 ends at boundary 452. Beyond this point, the contents of the two blocks diverge. The boundary 452 does not align with any boundary between sub-blocks but can rather be found at some byte location relative to the fifth sub-block, 140-5.

As shown in FIG. 4B, three distinct ranges are formed: a duplicate range $R_{DUP}$ 420; a first unique range $R_{UQ}$ 440; and a second unique range $R_{UQ2}$ 460. Boundary 450 separates $R_{DUP}$ from $R_{UQ}$, and boundary 452 separates $R_{DUP}$ from $R_{UQ2}$. Range $R_{DUP}$ 420 matches target range $R_{TARG}$ 430 byte-for-byte.

Figure 4C:
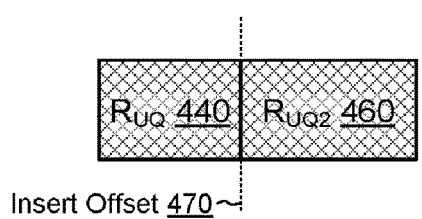

As shown in FIG. 4C dedupe manager 132 may combine the two unique ranges, $R_{uQ}$ 440 and $R_{uQ2}$ 460, by placing them adjacently, while specifying an insert offset 470 to identify their boundary. The insert offset range 470 is so named as it identifies the location at which the contents of $R_{DUP}$ 420 is to be inserted when the candidate block 140 is reconstructed, e.g., when a later read request arrives. In an example, the SP 120 stores the insert offset 470 in mapping metadata for the candidate block 140. Although not addressed previously, the examples in FIGS. 2A/2B and 3A/3B may also involve specifying an insert offset, which in those examples would indicate whether the duplicate range $R_{DUP}$ is to be inserted before or after the unique range, $R_{UQ}$, when reconstructing the respective candidate blocks.

Figure 5A:
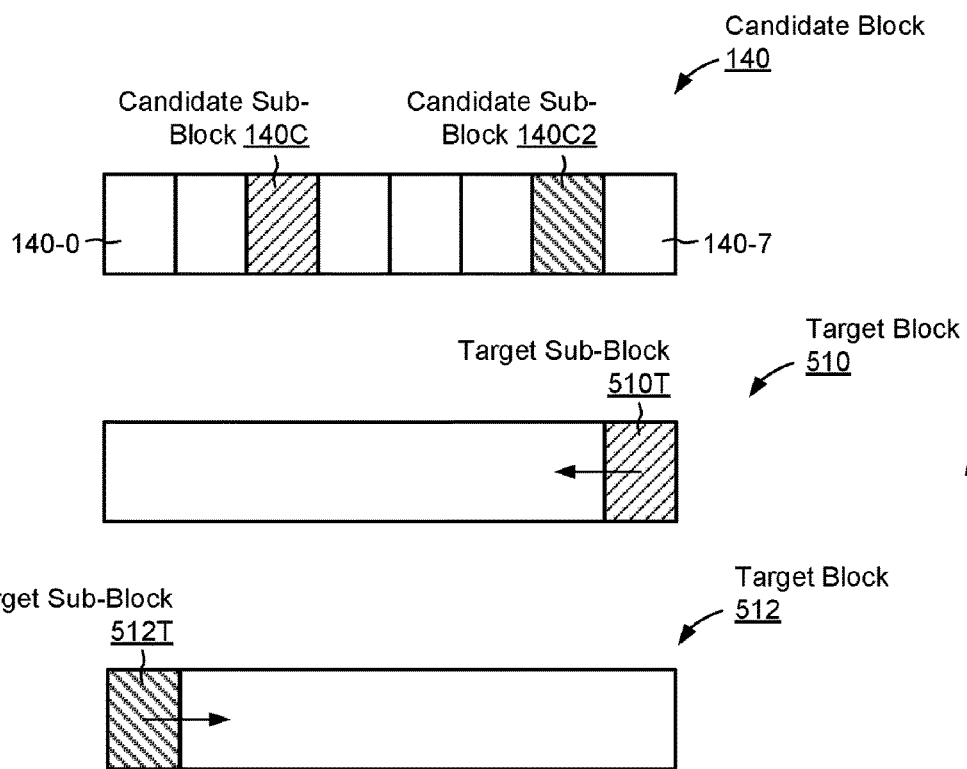
FIGS. 5A and 5B are diagrams that show an example sequence for identifying two duplicate ranges and a unique range of a candidate block when two candidate sub-blocks have matched to two different target blocks.
Figure 5B:
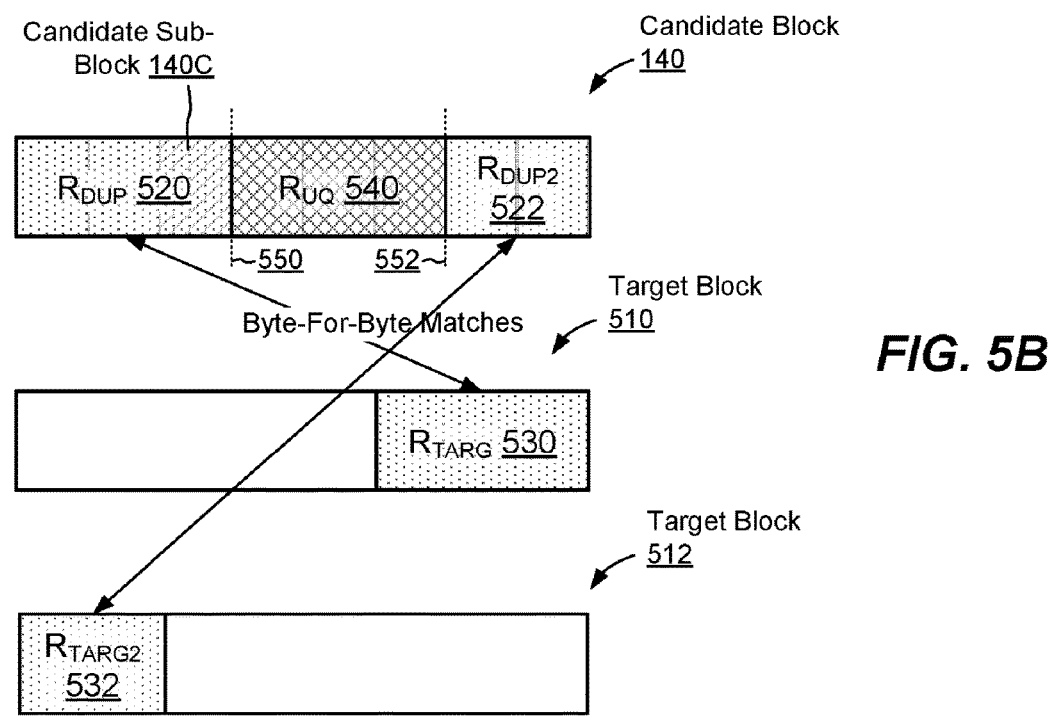

Referring to FIGS. 5A and 5B, shown is a slightly more complex example still. As shown in FIG. 5A, two candidate sub-blocks, 140C and 140C2, of the candidate block 140 have produced respective matches to two different entries in the digest database 150. In this example, the different matches reference different target blocks 510 and 512. In particular, candidate sub-block 140C has matched target sub-block 510T, which occupies the last position in target block 510, and candidate sub-block 140C2 has matched target sub-block 512T, which occupies the first position of target block 512. As shown in FIG. 5B, the dedupe manager 132 has identified two duplicate ranges, $R_{DUP}$ 520 and $R_{DUP2}$ 522, with a single unique range $R_{UQ}$ 540 separating the two duplicate ranges. Duplicate range $R_{DUP}$ 520 matches, byte-for-byte, target range $R_{TARG}$ 530 in target block 510, and duplicate range $R_{DUP2}$ 522 matches, byte-for-byte, target range $R_{TARG}$ 532 in target block 512. Boundaries 550 and 552 separate the ranges of the candidate block 140 in the manner shown. As usual, the process stores the unique range $R_{UQ}$ 540 in a storage extent in the physical layer 180.

The presence of two duplicate ranges may necessitate the creation of additional metadata, as BVSc of the candidate block 140 must point to two different target ranges 530 and 532 in two different target blocks 510 and 512. Two insert offsets may be specified, as well, to indicate where each duplicate range is to be inserted relative to the unique range.

Figure 6A:
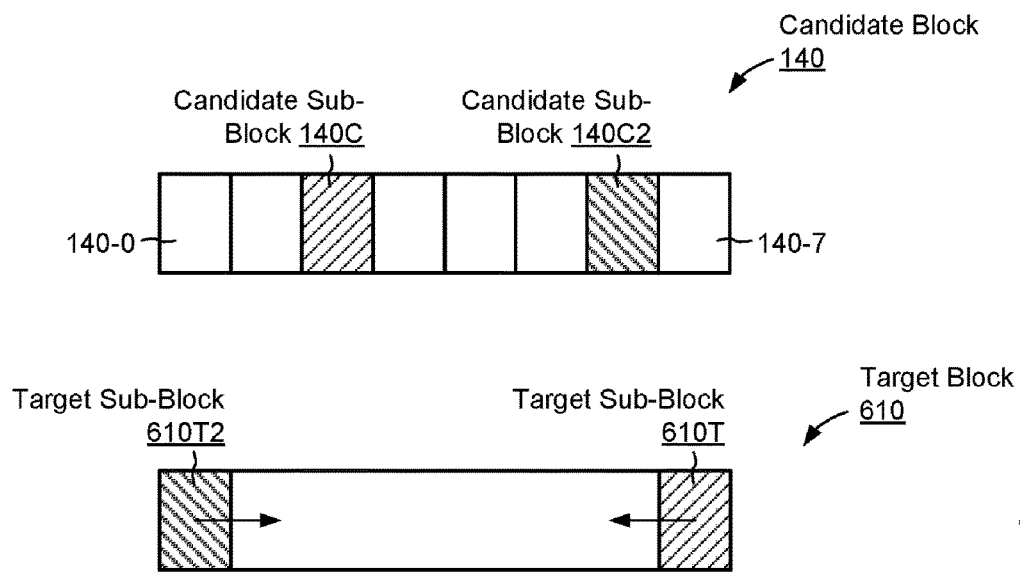
FIGS. 6A and 6B are diagrams that show an example sequence for identifying two duplicate ranges and a unique range of a candidate block when two candidate sub-blocks have matched to two distinct ranges of a single target block.
Figure 6B:
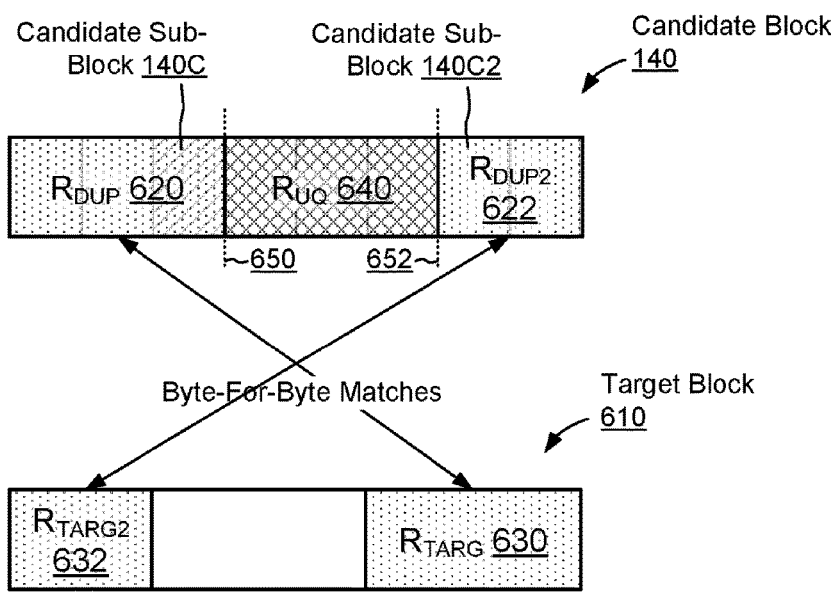

Referring to FIGS. 6A and 6B, shown is yet another example. This example is similar to the one shown in FIGS. 5A and 5B, but here two target sub-blocks 610T and 610T2 are found within the same target block 610, rather than in two different target blocks. Candidate sub-block 140C has matched to target sub-block 610T, and candidate sub-block 140C2 has matched to target sub-block 610T2. As shown in FIG. 6B, two duplicate ranges are formed, $R_{DUP}$ 620 and $R_{DUP2}$ 622, which match, respectively, with target ranges $R_{TARG}$ 630 and $R_{TARG2}$ 632. A single unique range $R_{UQ}$ 640 is formed in the candidate block 140 between the two duplicate ranges, with boundaries 650 and 652 identified as shown. Unique range $R_{UQ}$ 640 may be stored in the usual way. BVSc of the candidate block 140 must now point to two different target ranges 630 and 632 in the target block 610, which may require two different insert offsets.

Figure 7:
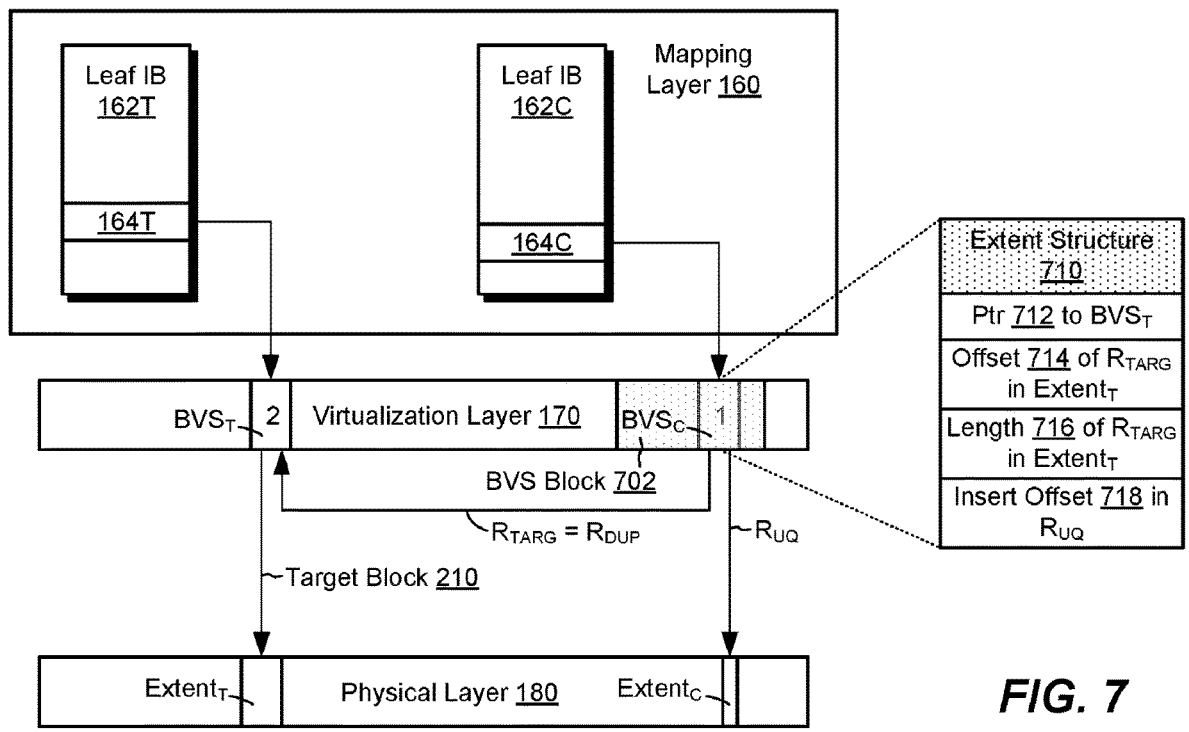
FIG. 7 is a block diagram of an example arrangement where mapping metadata is provided in a virtualization layer for supporting deduplication at sub-block granularity.

FIG. 7 shows the example metadata structures of FIG. 1 in additional detail. Here, it is seen that BVSc, which is provided for mapping the candidate block 140, is located within a BVS block 702. In some examples, BVS block 702 may include a large number of BVSs. Each BVS has a reference count, which tracks the number of block pointers that point to the respective BVS. For instance, BVSc has a reference count of one, because only one block pointer, pointer 164C in leaf IB 162C, points to it. BVST, which is provided for mapping the target block 210, has a reference count of two, reflecting the fact that both block pointer 164T in leaf IB 162T and a pointer in BVSc point to it.

As shown to the right of FIG. 7, BVSc stores an extent structure 710. The extent structure 710 is metadata that references a range of data in the current block within the data of another block. For example, BVSc supports mapping for a particular logical address of a particular data object hosted by the data storage system 116, and BVSc resolves that logical address into a first pointer to the unique range $R_{UQ}$ and a second pointer to the duplicate range $R_{DUP}$. Here, the first pointer of BVSc points to $Extent_C$ and the second pointer, which is provided within the extent structure 710, points to the target range $R_{TARG}$ of the target block 210. Example metadata elements of the extent structure 710 include the following:

Pointer 712. An address of BVST, the BVS of the target block where the duplicate range resides in the virtualization layer 170.

Offset 714. Offset of the target range $R_{TARG}$ in $Extent_T$. Used for locating the starting location of $R_{TARG}$, which matches $R_{DUP}$.

Length 716. The length of the target range $R_{TARG}$ in $Extent_T$. The offset 714 and length 716 together fully identify the target range $R_{TARG}$ within $Extent_T$, which is itself fully identified by the pointer 712.

Insert Offset 718. An offset relative to the unique range $R_{UQ}$ in $Extent_C$ where the contents of the duplicate range $R_{DUP}$ are to be inserted when reconstituting the candidate block 140.

One should appreciate that an extent structure 710 is required only in cases where some of the contents that would normally be contained in an extent pointed to by a BVS have been deduplicated, such that those contents reside in a different physical extent from the one pointed to by that BVS. Thus, only some BVSs will use extent structures 710, whereas others do not. In addition, some BVSs may employ multiple extent structures 710. The examples presented in FIGS. 5A/5B and 6A/6B would each require two extent structures 710, one for identifying each of the two duplicate ranges presented in each example. Further, one should appreciate that the placement of extent structures 710 in the mapping metadata may be varied.

Figure 8:
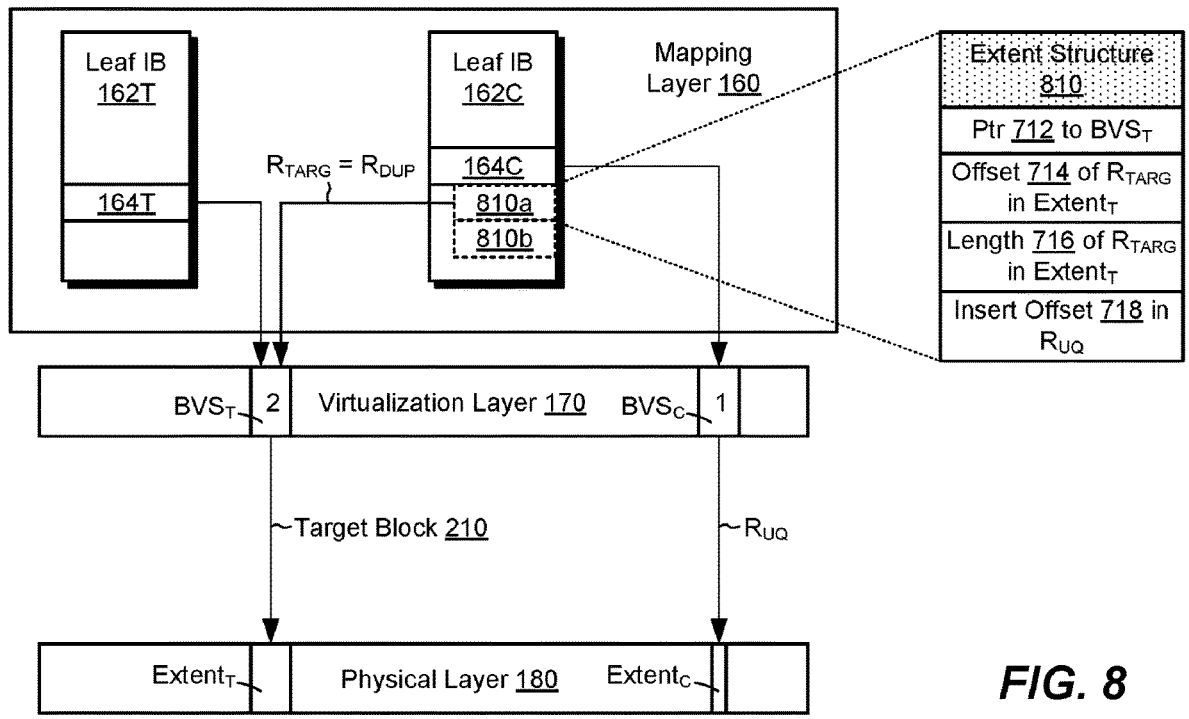
FIG. 8 is a block diagram of an example arrangement where mapping metadata is provided in a mapping layer for supporting deduplication at sub-block granularity.

FIG. 8 shows another example of an extent structure. Rather than being located in $BVS_c$, as was the case in FIG. 7, the extent structure 810 is instead located in leaf IB 162C. Placing the extent structure 810 in the leaf IB has the inherent advantage of avoiding multiple hops. In FIG. 7, for example, the SP 120 would have to access BVSc, read its extent structure 710, and then access BVST. Those accesses would have to be performed in order, one after the other. By contrast, locating the extent structure 810 in the leaf IB, as shown in FIG. 8, allows the SP 120 to access both BVSc and $BVS_T$ in parallel, promoting faster processing.

Between zero and two extent structures are needed for each leaf-IE block pointer, with two extent structures shown here as structures 810a and 810b. As the leaf IB is itself a block, which has limited space, it may be preferable in some examples to compress the contents of the leaf IB when many extent structures 810 are needed. Each leaf IB 162 includes a header and an array of block pointers. In an example, the header is marked with a label that identifies the pointers as compressed or uncompressed, and the array of block pointers (but not the header) is compressed, along with the associated extent structures 810. In this manner, ample space may be made available for any required number of extent structures 810.

Figure 9:
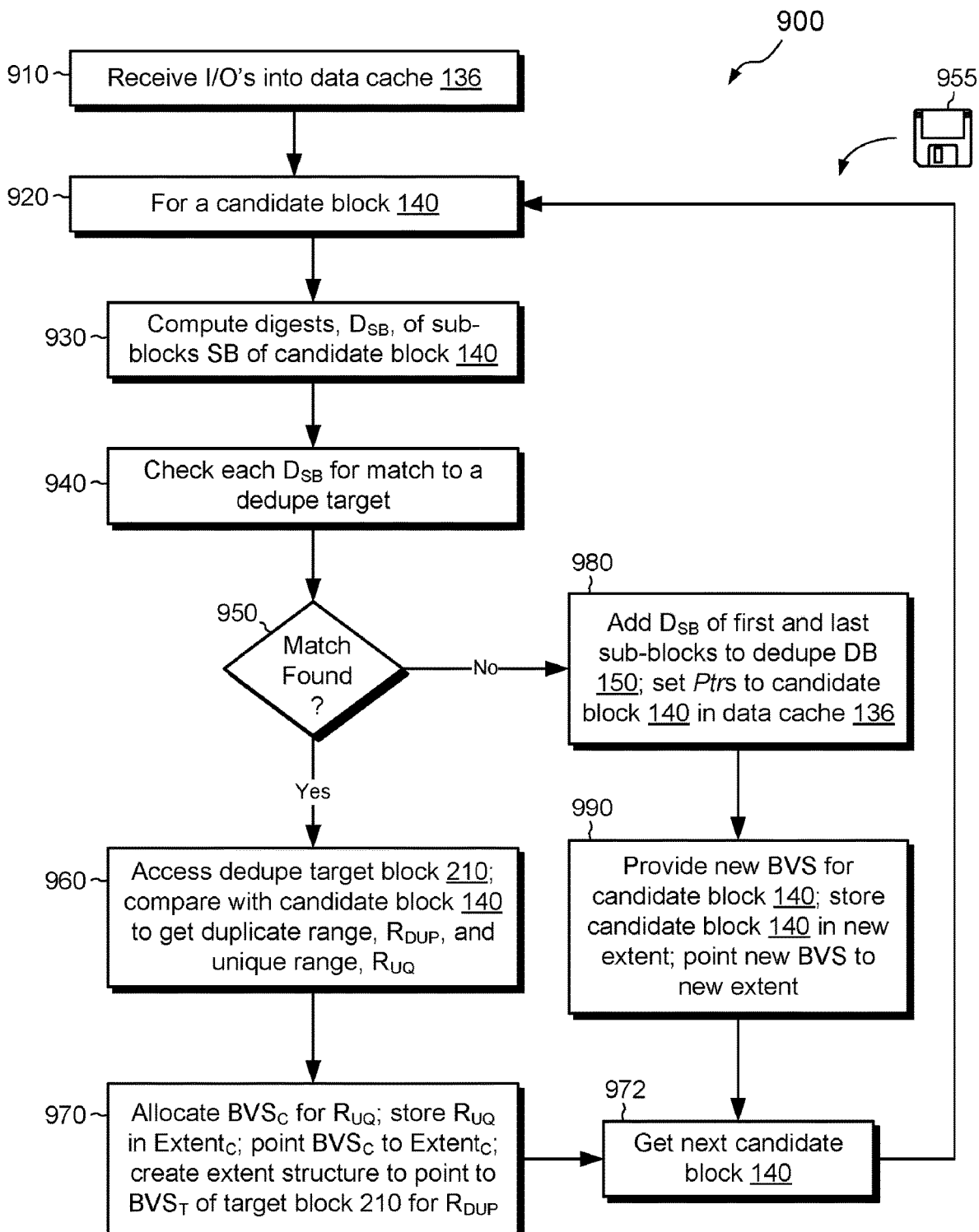
FIG. 9 is a flowchart that shows an example method of processing I/O write requests in the environment of FIG. 1.
Figure 10:
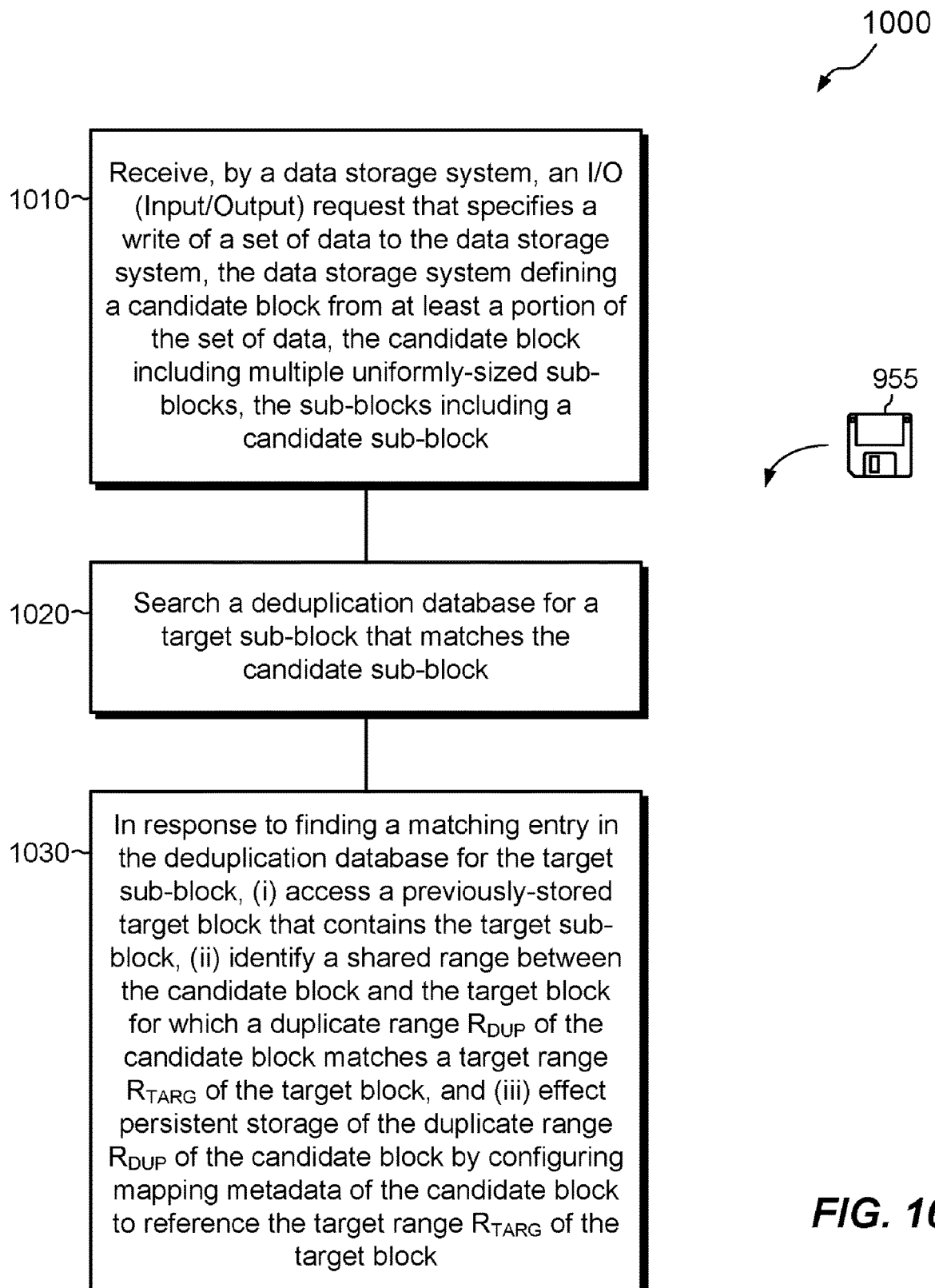
FIG. 10 is a flowchart that shows an example method of performing data deduplication in the environment of FIG. 1.

FIGS. 9 and 10 show flowcharts of processing steps or methods 900 and 1000 that may be carried out in connection with the environment 100. The methods 900 and 1000 are typically performed, for example, by the software constructs described in connection with FIG. 1, which reside in the memory 130 of the storage processor 120 and are run by the set of processors 124. The various acts of methods 900 and 1000 may be ordered in any suitable way. Accordingly, embodiments may be constructed in which acts are performed in orders different from those illustrated, which may include performing some acts simultaneously.

FIG. 9 shows example method 900 of performing inline deduplication at sub-block granularity. At 910, the SP 120 receives sets of data specified in write I/O requests 112 into the data cache 136. The data cache 136 stores the data in block-size buffer caches (blocks). Each such block includes multiple sub-blocks such as sub-blocks 140-0 to 140-7.

At 920, the dedupe manager 132 obtains a candidate block 140 from the data cache 136 and performs various acts relating to deduplication of the candidate block 140. For example, at 930, the dedupe manager 132 computes digests of at least one, but preferably all, sub-blocks 140-1 to 140-7 of the candidate block 140. At 940, the dedupe manager 132 searches the dedupe database 150 for each computed digest. At 950, if a match is found, operation proceeds to 960, whereupon the dedupe manager 132 accesses the target block 210 (or any of the other target blocks described above), by following the reference RefT in the matching entry 152. The dedupe manager 132 then compares the candidate block 140 with the target block 210 and identifies the duplicate range $R_{DUP}$ of the candidate block 140, which contains the same data as the corresponding target range $R_{TARG}$ of the target block 210. The dedupe manager 132 also identifies a unique range $R_{UQ}$ of the candidate block 140.

With the duplicate range $R_{DUP}$ and the unique range $R_{UQ}$ identified, operation proceeds to 970, whereupon the SP 120 allocates BVSc for the candidate block 140, stores $R_{UQ}$ in Extent$_C$, and points BVSc to $R_{UQ}$. The SP 120 also effects storage of $R_{DUP}$ by reference, by creating an extent structure 710 (or 810) that points to range $R_{TARG}$ of the target block 210, e.g., by pointing to BVS$_T$ (via pointer 712), specifying the offset 714 and length 716 of $R_{TARG}$ in Extent$_T$, and specifying an insert offset 718 that identifies where $R_{DUP}$ is to be inserted relative to $R_{UQ}$ when reconstructing the candidate block 140. If two distinct duplicate ranges are detected, two extent structures 710 (or 810) may be created. In this manner, the data storage system 116 accounts for and can later access all the data of the candidate block 140 without having to store the duplicate range $R_{DUP}$. At 972, a next candidate block 140 is obtained and the operation described in steps 920-970 is repeated for the new candidate block. Although candidate blocks may be processed serially, as shown, they may also be processed in parallel, e.g., with multiple threads processing respective candidate blocks simultaneously.

Returning to 950, if no match is found to any of the sub-blocks 140-1 to 140-7 of the candidate block 140, operation proceeds to 980, whereupon the dedupe manager 132 creates new entries in the dedupe database 150 for the first and last sub-blocks of the candidate block 140. Creating new entries includes establishing pointers Ptr in each new entry to the candidate block 140 in the data cache 136.

At 990, the SP 120 stores the candidate block 140, without performing deduplication, by providing a new BVS for the candidate block 140, storing the candidate block 140 in a new storage extent, and pointing the new BVS to the new storage extent. Data may be stored in compressed or uncompressed form.

Referring to FIG. 10, shown is a method 1000 of performing data deduplication and summarizes some of the improvements described above. At 1010, a data storage system 116 receives an I/O (Input/Output) request 112 that specifies a write of a set of data 138 to the data storage system. The data storage system 116 defines a candidate block 140 from at least a portion of the set of data 138. The candidate block includes multiple uniformly-sized sub-blocks, e.g., 140-0 to 140-7, and the sub-blocks include a candidate sub-block 140C.

At 1020, a deduplication database 150 is searched for a target sub-block that matches the candidate sub-block 140C. For example, the dedupe manager 132 computes a digest of the candidate sub-block 140C and searches the dedupe database 150 for a matching entry.

At 1030, in response to finding a matching entry 152 in the deduplication database 150 for the target sub-block (e.g., 210T, 310T, etc.), (i) accessing a previously-stored target block (e.g., 210, 310, etc.) that contains the target sub-block, (ii) identifying a shared range between the candidate block 140 and the target block for which a duplicate range $R_{DUP}$ of the candidate block matches a target range $R_{TARG}$ of the target block, and (iii) effecting persistent storage of the duplicate range $R_{DUP}$ of the candidate block 140 by configuring mapping metadata (e.g., 710, 810) of the candidate block 140 to reference the target range $R_{TARG}$ of the target block.

An improved technique has been described for performing data deduplication, which operates at the sub-block granularity by searching a deduplication database 150 for a match between a candidate sub-block 140C of a candidate block 140 and a target sub-block of a previously-stored target block. When a match is found, the technique identifies a duplicate range $R_{DUP}$ shared between the candidate block and the target block and effects persistent storage of the duplicate range $R_{DUP}$ by configuring mapping metadata of the candidate block 140 so that it points to the duplicate range $R_{TARG}$ in the target block.

Although techniques have been described for performing data deduplication inline with I/O requests 112 (e.g., also described in more detail in following paragraphs), similar techniques can be applied when performing deduplication in the background. Background deduplication can proceed substantially as described above, except that the dedupe manager 132 obtains candidate blocks 140 from persistent storage, rather than from incoming I/O requests 112. For example, SP 120 reads a data block from persistent storage, computes digests from sub-blocks of the data block, and searches the dedupe database 150 for a match to one or more of the sub-blocks. If the search reveals a match to a previously-stored target block, the SP 120 identifies a duplicate range $R_{DUP}$ and a unique range $R_{UQ}$ of the candidate block 140, effecting storage of the duplicate range $R_{DUP}$ by configuring metadata (e.g., an extent structure 710 or 810 in a BVS or IB) to reference the corresponding range $R_{TARG}$ in the target block. Also, the SP 120 replaces the storage extent that holds the previously-stored version of the candidate block 140 with a new storage extent that stores only the unique range $R_{UQ}$ of the candidate block 140. The new storage extent may be written in place of the original one, with the residual space being freed, or the unique range $R_{UQ}$ may be written to a newly allocated storage extent in the physical layer 180, with the entirety of the extent holding the original candidate block being freed.

Also, the above description has indicated that certain structures "reference" or "point to" other structures. One should appreciate that any such reference or pointing can be direct or indirect, meaning that intervening pointing structures can also be present. Further, although referenced or pointed-to structures may be identified hereinabove as "blocks," such blocks need not be persistently-stored versions. For example, such blocks may be cached versions of data blocks, or memory-resident structures that have not yet been stored on persistent storage devices.

Further, the extent structures 710 or 810 (or more generally the block level metadata) can be adapted to store additional metadata for tracking small differences between sub-blocks. For instance, a data comparison of a candidate block with a target block that extends beyond the initially-matching candidate and target sub-blocks (such as shown in FIG. 2B) may reveal small differences between adjacent sub-blocks (of candidate and target blocks) being compared, which sub-blocks are almost but not quite identical. Such differences may extend over only a small number of bytes, which could easily fit into available extra space in extent structures or other block level metadata. Thus, additional improvements may identify such minor differences (deltas) and store them in metadata along with a pointer to their locations in the block or sub-block. In this manner, the dedupe match can be extended to include the nearly-matching block or sub-block, which becomes part of the duplicate range $R_{OUP}$ and can thus be deduplicated. During a later read, the SP 120 can reconstruct the block in the usual way and then access the delta from the metadata and insert the delta in place of the duplicate data at the indicated location, thus restoring the difference. Such an embodiment may be useful where small differences in sub-blocks of different data blocks arise merely from timestamps, labels, or minor edits.

Consistent with discussion herein, the data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. The data path and control path each define two separate logical flow paths.

An embodiment of a data storage system in accordance with the techniques herein may perform different data processing operations or services on stored user data. For example, the data storage system may perform one or more data reduction operations, such as data deduplication and compression as discussed herein, as well as other types of operations or services. Generally, data deduplication and compression techniques are known in the art and any suitable such technique may be used in an embodiment in accordance with the techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with the techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate sub-blocks whereby only a single instance of the sub-block is retained (stored on physical storage) and where pointers or references may be used in connection with duplicate or redundant copies (which reference or identify the single stored instance of the data sub-block).

Figure 11:
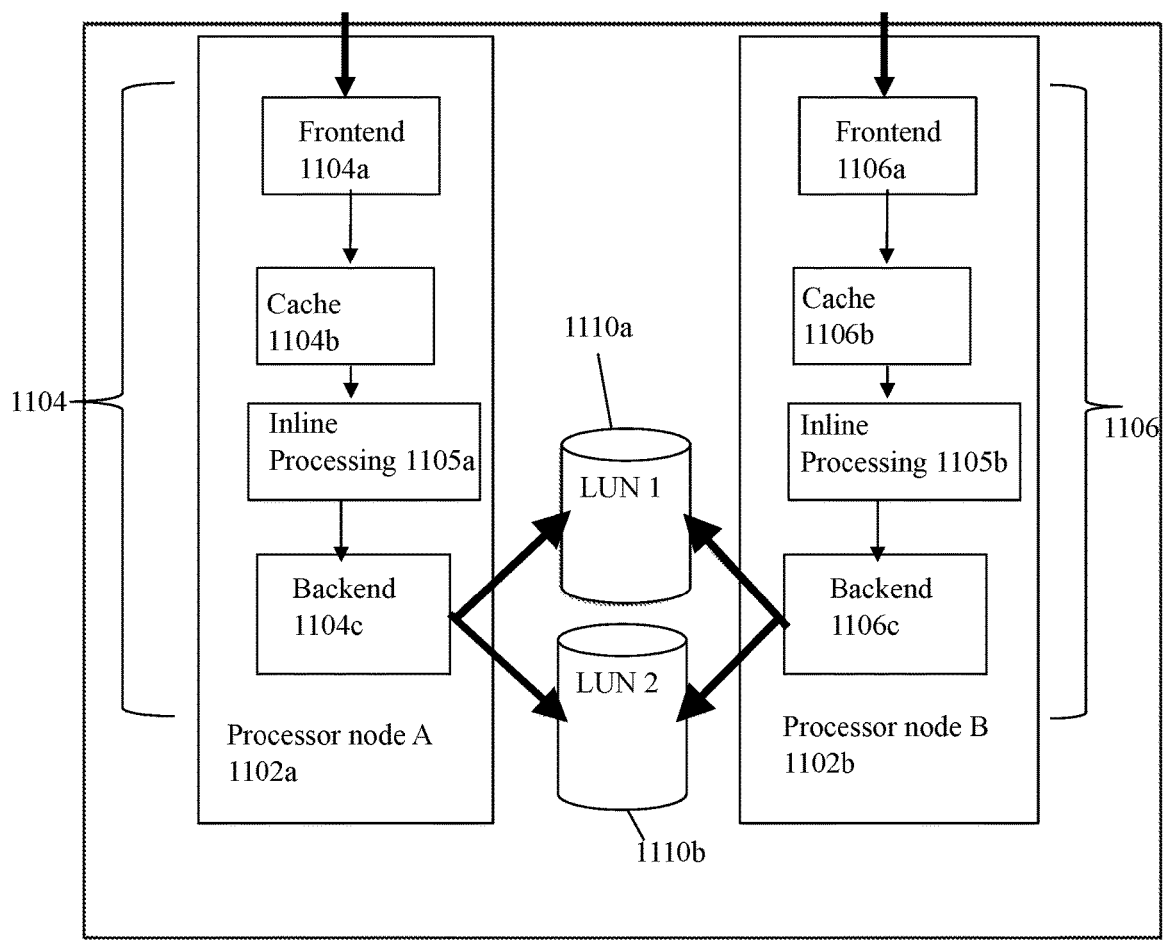
FIG. 11 is an example illustrating in-line processing as may be performed in an embodiment in accordance with the techniques herein.

With reference to FIG. 11, shown is an example 1100 illustrating components that may be included in the data path in at least one existing data storage system in accordance with the techniques herein. The example 1100 includes two processor nodes A 1102a and B 1102b and associated software stacks 1104, 1106 of the data path where I/O requests may be received by either processor node 1102a or 1102b. In the example 1100, the data path 1104 of the processor node A 1102a includes: the frontend (FE) component 1104a (e.g., an FA or front end adapter) that translates the protocol-specific request into a storage system-specific request; a cache layer 1104b (e.g., data cache) where data is temporarily stored; an inline processing layer 1105a; and a backend (BE) component 1104c that facilitates movement of the data between the cache and the permanent non-volatile storage (e.g., back end physical non-volatile storage devices accessed by the BE components such as controllers or device interfaces that access the physical storage). During movement of data in and out of the cache layer 1104b (e.g., such as in connection with reading and writing data respectively, to the physical storage 1110a, 1110b), inline processing may be performed by the layer 1105a. Such inline processing operations of 1105a may be optionally performed and may include any one of more data processing operations in connection with data that is flushed from the cache layer 1104b to the back-end non-volatile physical storage 1110a, 1110b, as well as when retrieving data from the back-end non-volatile physical storage 1110a, 1110b to be stored in the cache layer 1104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for the data path 1104, the data path 1106 for the processor node B 1102b has its own FE component 1106a, cache layer 1106b, inline processing layer 1105b, and BE component 1106c that are respectively similar to the components 1104a, 1104b, 1105a and 1104c. The elements 1110a, 1110b denote physical storage provisioned for LUNs whereby an I/O may be directed to a location or logical address to read data from, or write data to, the logical address. The LUNs 1110a, 1110b are examples of storage objects representing logical storage entities included in an existing data storage system configuration. Since, in this example, writes directed to LUNs 1110a, 1110b may be received for processing by either of the nodes 1102a and 1102b, the example 1100 illustrates what may also be referred to as an active-active configuration.

In connection with a write operation as may be received from a host and processed by processor node A 1102a, the write data may be written to the cache 1104b, marked as write pending (WP) denoting it needs to be written to physical storage 1110a, 1110b and, at a later point in time, the write data may be destaged or flushed from the cache to the physical storage 1110a, 1110b by the BE component 1104c. The write request may be considered complete once the write data has been stored in the cache whereby an acknowledgement regarding the completion may be returned the host (e.g., by component 1104a). At various points in time, WP data stored in the cache is flushed or written out to the physical storage 1110a, 1110b. In connection with the inline processing layer 1105a, prior to storing the original data on the physical storage 1110a, 1110b, compression and data deduplication processing may be performed that converts the original data (as stored in the cache prior to inline processing) to a resulting form (that may include compressed and/or deduplicated portions) which is then written to the physical storage 1110a, 1110b. In at least one embodiment, when deduplication processing determines that a portion (such as a block or one or more sub-blocks) of the original data is a duplicate of an existing data already stored on the physical storage 1110a, 1110b, that particular portion of the original data is not stored in a compressed form and may rather be stored in its deduplicated form (e.g., there is no need for compression of a block or sub-blocks determined to be duplicates of other existing data). If an original data portion is not a duplicate of an existing portion already stored on the physical storage 1110a, 1110b, the original data portion may be compressed and stored in its compressed form on the physical storage 1110a, 1110b.

In connection with a read operation to read a block of data, a determination is made as to whether the requested read data block is stored in its original form (in the cache 1104b or on the physical storage 1110a, 1110b), or whether the requested read data block was previously deduplicated or compressed. If the requested read data block (which is stored in its original decompressed, non-deduplicated form) is in the cache, the read data block is retrieved from the cache 1104b and returned to the host. Otherwise, if the requested read data block is not in the cache 1104b but stored on the physical storage 1110a, 1110b in its original form, the requested data block is read by the BE component 1104c from the backend storage 1110a, 1110b, stored in the cache and then returned to the host.

If any sub-block of the requested read data block was previously deduplicated, the original corresponding sub-blocks of the read data block are recreated and stored in the cache in its original form so that it can be returned to the host. If the requested read data block, or unique sub-block thereof, was previously compressed, the block (or compressed portion thereof) is first decompressed prior to sending the read data block to the host. If the compressed read data block or sub-blocks are already stored in the cache, the data may be uncompressed to a temporary or buffer location, the uncompressed data is sent to the host, and the buffer or temporary location is released. If the compressed read data block (or compressed sub-blocks thereof) is not in the cache but stored on the physical storage 1110a, 1110b, the compressed read data block (or compressed portions thereof) may be read from the physical storage 1110a, 1110b into the cache, uncompressed to a buffer or temporary location, and then returned to the host. Thus, requested read data stored on the physical storage 1110a, 1110b may be stored in a deduplicated or compressed form as noted above where processing is performed by the inline processing 1105a to restore or convert the deduplicated or compressed form of the data to its original data form prior to returning the requested read data to the host.

When the processor performs processing, such as in connection with inline processing 1105a, 1105b as noted above, data may be loaded into the cache. In particular, inline compression (ILC) and inline data deduplication (ILD) may be performed as part of the inline processing 1105a, 1105b. In at least one embodiment as noted above, the size of a data block processed by ILC and ILD may be 4K bytes where the block is partitioned into 8 equal sized portions (e.g., 512 bytes each) referred to as sub-blocks or sectors.

In at least one embodiment in accordance with the techniques herein, following paragraphs may provide examples of deduplication processing performed inline as part of the I/O or data path, as described above in connection with ILC and ILD processing of FIG. 11. However, it should be noted that the techniques herein are more generally applicable for use in deduplication performed which is not inline or not part of the I/O or data path, such when processing a data set offline or in the background.

Described above are the techniques that may be used for performing data deduplication that provide for a smaller or finer level of granularity for determining matching or duplicate data portions at the sub-block or sector level, sometimes referred to herein as partial deduplication, partial block deduplication, or sub-block deduplication. What will now be described are additional techniques that may be used to further optimize data deduplication processing in an embodiment.

In the following paragraphs and examples, reference is made to data blocks each including 8 sub-blocks or sectors for purposes of illustration. Generally, each data block may include any suitable number of sub-blocks.

Figure 12:
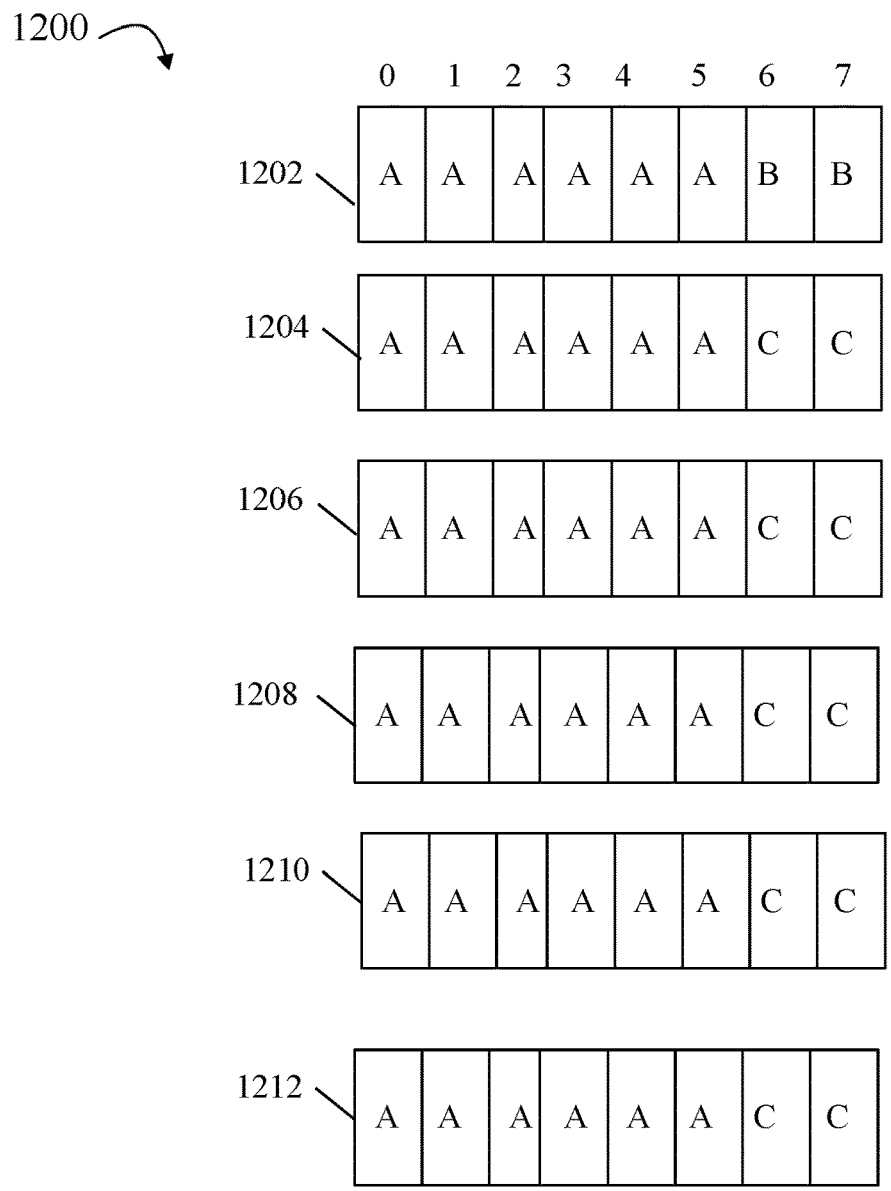

Referring to FIG. 12, shown is an example 1200 illustrating 6 data blocks for which deduplication processing may be performed using the partial block or sub-block deduplication as described above where the sub-block or partial block deduplication detects partially matching data blocks based on the digests of the first and last sub-blocks of a target data block currently stored in the deduplication database (dedupe DB) 150. The example 1200 includes 6 data blocks 1202, 1204, 1206, 1208, 1210 and 1212 each including 8 sub-blocks identified as sub-blocks 0 through 7. In following paragraphs, sub-block 0 for a particular data block may also be referred to as the left-most or "L" sub-block and sub-block 7 for a particular data block may also be referred to as the right most or "R" sub-block. Content such as A, B, and C stored within each sub-block or sector is illustrated. For example, the data content of A such as stored in the sub-block 0 of the data block 1202 means that the sub-block 0 of the data block 1202 contains all 0xAA bytes, the data content of B such as stored in the sub-block 6 of the data block 1202 means that the sub-block 6 of the data block 1202 contains all 0xBB bytes, and so on. Two sub-blocks illustrated as both including A, such as the sub-block 0 of the data block 1202 and the sub-block 0 of the data block 1204, mean that both such sub-blocks include the same content, "A".

For this example, assume that the 6 blocks —1202, 1204, 1206, 1208, 1210 and 1212—are received sequentially in order for deduplication processing using the sub-block deduplication as described above.

When the first block 1202 is encountered, assume that the block 1202 is a new target block where there are no full or sub-block deduplication target matches found in the dedupe DB 150 for the first block 1202. As a result, the first block 1202 is added as a new target block to the dedupe DB 150. In particular, entries for the digests of the first sub-block 0 and the last sub-block 7 of the data block 1202 are stored in the dedupe DB 150 and storage is allocated to persistently store the content for all 8 sub-blocks of the data block 1202. Consistent with discussion elsewhere herein, a sub-block digest stored in the dedupe DB 150 is also associated with a position or indicator to differentiate between L and R sub-block digests.

Assume now that the second data block 1204 is processed with content as illustrated in the example 1200. Deduplication processing determines that the data block 1204 is a partial deduplication match of the target data block 1202. More specifically, processing may determine that the left most sub-blocks 0-5 of the data block 1204 match the left most sub-blocks 0-5 of the target block 1202. In this case, the second block 1204 is deduplicated as described herein as a partial deduplication match. Consequently, the data block 1204 is not processed as a new target block. More specifically, the digests for the L and R sub-blocks of the data block 1204 are not entered into the dedupe DB 150 as a new dedupe target block because it is a partial deduplication match. Consistent with discussion above, a target block is a data block that has been determined by data deduplication processing as not de-duplicable (e.g., no full or partial block match with an existing target block having its first and last sub-blocks stored in the dedupe DB 150).

Subsequently, processing is also performed, in order, for the data blocks 1206, 1208, 1210 and 1212 whereby the left most sub-blocks 0-5 of each of the blocks 1206, 1208, 1210 and 1212 are similarly determined as partial deduplication matches to the left most sub-blocks 0-5 the target data block 1202. The foregoing partial deduplication matches may be determined for the blocks 1204, 1206, 1208, 1210 and 1212 even though it may be more desirable to take advantage of the full block matches between the data block 1204 and each of the data blocks 1206, 1208, 1210 and 1212. For example, rather than have deduplication processing determine the 5 partial deduplication matches between the target block 1202 and the data blocks 1204, 1206, 1208, 1210 and 1212, it may alternatively be preferred to store the data block 1204 as a new target block in the dedupe DB 150. In this alternative case, subsequent processing of the data blocks 1206, 1208, 1210 and 1212 would be determined as 4 full data block matches to the block 1204.

In order to take advantage of the alternative full data block matching deduplication scenario described above (e.g., 4 full block matches between the data block 1204 and the data blocks 1206, 1208, 1210 and 1212), processing would have to forego the partial deduplication opportunity for the data block 1204. However, at the time of processing the data block 1204, processing cannot foresee or predict the particular data blocks 1206, 1208, 1210 and 1212 that are actually subsequently received. In other words, in order to forego the partial data deduplication opportunity of the block 1204, processing would have predict or foresee the opportunity of the more favorable full deduplication opportunities that arise later in connection with the full block matches between the data block 1204 and each of the data blocks 1206, 1208, 1210 and 1212.

Described in the following paragraphs are techniques that may be used to track, detect and take advantage of such potential full or complete data block deduplication opportunities that may arise. In at least one embodiment, partial deduplication processing may be modified as described below responsive to detecting a partial deduplication match between an existing target block (e.g., the data block 1202) already stored in the dedupe DB 150 and a candidate block (e.g., the data block 1204).

Reference is made back to the dedupe DB 150 of FIG. 1. In at least one embodiment, the dedupe DB 150 may be stored in a portion of the memory 130 used as a cached copy of the dedupe DB 150. The dedupe DB 150 stored in the memory, such as a cache, may be only a subset or portion of the actual total number of entries of the on-disk dedupe DB as stored persistently on non-volatile physical storage. In at least one embodiment, deduplication processing may be performed using only the portion of the dedupe DB currently in the memory or the cache without retrieving other portions of the dedupe DB from the non-volatile storage. In other words, if a look up for a digest of a sub-block is performed and there is no matching entry in the cached portion of the dedupe DB 150, in such an embodiment there is no further lookup in the on-disk dedupe DB and processing determines that there is no entry in the dedupe DB for digest (e.g., sub-block is unique and not a duplicate).

In an embodiment in accordance with the techniques herein, the dedupe DB 150 may include entries for the L and R sub-blocks of each target block as described above in connection with FIG. 1. Additionally, the dedupe DB 150 may also include entries for the digest of each complete or full target data block (e.g., formed using all 8 sub-blocks of the target block). Thus, each entry of the dedupe DB 150 may include a digest, an associated digest key type of L (for digests of the L sub-block), R (for digests of the R sub-block) or F (for digests of the full target data block), and a reference (ref), to a location in the data storage system, of a data block. More generally, the reference field of an entry that is of one of the types L, R or F maps to a location in some form of memory or storage containing a data block whereby the reference field is used to access the actual content stored in the data block. The foregoing and other features are described below in more detail.

If an entry of the dedupe DB has a digest key type of L, the entry includes a digest of an L sub-block of a particular target data block stored at the location identified by the reference field of the entry. If an entry of the dedupe DB has a digest key type of R, the entry includes a digest of an R sub-block of a particular target data block stored at the location identified by the reference field of the entry. If an entry of the dedupe DB has a digest key type of F, the entry includes a digest of a full target data block and the content of the target data block having the digest may be obtained using the reference field of the entry. The F digest key type may also be referred to herein as a non-speculative, full or regular F type entry having a valid reference field used to obtain data for a target data block.

Additionally, an entry of the dedupe DB may be tagged as a special F sub-type referred to herein as a F speculative entry or a counting entry. If an entry of the dedupe DB has a digest key type of F speculative, denoting a speculative F entry or counting entry, the entry includes a digest of a full data block that has been partially deduplicated. In such a case, data deduplication processing has determined that the data block is not a full block match (e.g., 8 sub-block match) to an existing target data block already stored in the dedupe DB 150. However, data deduplication processing has determined that up to 7 sub-blocks of the data block match sub-blocks of one or more existing target data blocks. The reference field of the F speculative type of entry or counting entry contains a null or other "no data" indicator that does not identify a valid data location. The F speculative type entry or counting entry also includes a counter used to count the number of missed full block deduplication opportunities tracked by data deduplication processing described in more detail below. In one aspect, the F speculative type of entry may be characterized as a potential target block whereby subsequent processing counts missed full block deduplication opportunities by counting subsequent matches between a next candidate block's digest and the full block digest of the speculative F type entry.

Reference is again made to FIG. 12 where processing of the 6 data blocks will now be described using the improved processing that may be performed in an embodiment accordance with the techniques herein.

At a first point in time, the first data block 1202 is received for data deduplication processing. Data deduplication processing may include first determining whether there is a full match of the block 1202 to an existing target data block by performing full block deduplication processing. In at least one embodiment, full block deduplication processing of the data block 1202 may include computing the digest for the data block 1202 (e.g., using all 8 sub-blocks of the data block 1202), and then searching entries of the dedupe DB 150 having a digest key type of F non-speculative or F speculative. If a match is detected between the digest for the data block 1202 and a digest of a F non-speculative type entry of the dedupe DB 150, verification of matching data blocks may be performed by performing a byte by byte comparison between the content of data block 1202 and the content of the data block identified by the reference field of the F non-speculative type entry. Processing performed with respect to a match to an F speculative type entry of the dedupe DB 150 is deferred to further discussion below.

In at least one embodiment, if full block deduplication processing did not determine any full block matches to the data block 1202, then partial or sub-block deduplication processing may be performed at the sub-block level as described above (e.g., processing summarized in the FIG. 9). In this example, assume that both full block and partial or sub-block deduplication processing determine that the data block 1202 cannot be deduplicated (e.g., no full target block match found and no sub-block match of a target block found), whereby processing is performed to store the data block 1202 as a new target block. Such processing may include allocating memory (e.g., in the cache 136) for storing the content of the new target block 1202 and creating 3 new entries in the dedupe DB 150 as illustrated in the example 1300 of FIG. 13A. In connection with adding the first block 1202 is as a new target block to the dedupe DB 150, entries for the digests of the entire block 1202, the first sub-block 0 and the last sub-block 7 of the data block 1202 are stored in the dedupe DB 150. Additionally, storage is allocated to persistently store the content for all 8 sub-blocks of the data block 1202. In at least one embodiment, the new target block 1202 may also be stored in the cache.

Referring to the FIG. 13A, shown are the 3 new entries that may be created in the dedupe DB 150 for the data block 1202 as a new target block in at least one embodiment in accordance with the techniques herein. The example 1300 includes 3 entries 1310, 1312, and 1314. The example 1300 includes the following columns: digest 1302, digest key type 1304, reference (ref) 1306, and counter 1308, denoting information for entries of the dedupe DB 150. Consistent with discussion herein, the digest key type 1304 may be generally be one of the following types or sub-types: L, R, F non-speculative, and F speculative, although the example 1300 illustrates a particular example of the dedupe DB including 3 entries with the digest key types L R and F non-speculative. For a particular entry, the digest 1302 is a computed digest for data that varies with the digest key type 1304 of that entry. For a particular entry, the reference field 1306 generally identifies a location of a data block or otherwise may have a value of null/no data, depending on the digest key type 1304 of that entry. The counter 1308 is only applicable for use in entries having a digest key type of F speculative. Additional information on the columns or fields 1302, 1304 1306 and 1308 is discussed above and generally in more detail elsewhere herein.

The entries 1310 and 1312 may be created in a manner similar to that as described above (e.g., steps 980 and 990 of FIG. 9). The entry 1310 is created for the sub-block 0 or the L sub-block of the data block 1202. In the entry 1310: column 1302 includes D1, the calculated digest for the sub-block 0 or the L sub-block of the data block 1202; column 1304 includes the digest key type L; column 1306 includes the reference Ref1 (1202) denoting the location (e.g., cache location) of the data block 1202; and column 1308 is not in use for this entry (e.g., based on the particular digest key type of L).

The entry 1312 is created for the sub-block 7 or the R sub-block of the data block 1202. In the entry 1312: column 1302 includes D2, the calculated digest for the sub-block 7 or the R sub-block of the data block 1202; column 1304 includes the digest key type R; column 1306 includes the reference Ref1 (1202) denoting the location (e.g., cache location) of the data block 1202; and column 1308 is not in use for this entry (e.g., based on the particular digest key type of L).

The entry 1314 is created for the full or complete data block 1202. In the entry 1340: column 1302 includes D3, the calculated digest for entire data block 1202 (e.g., based on all 8 sub-blocks of 1202); column 1304 includes the digest key type F non-speculative; column 1306 includes the reference Ref1 (1202) denoting the location (e.g., cache location) of the data block 1202; and column 1308 is not in use for this entry (e.g., based on the particular digest key type of L).

Thus the example 1300 shows the state of the entries included in the dedupe DB 150 after block 1202 is processed and entered as a new target block.

Subsequently, at a second point in time, the data block 1204 is received for data deduplication processing. Data deduplication processing does not locate a full block match for data block 1204 to an existing target block. However, partial or sub-block deduplication processing as described herein may be performed and determines a partial block match between sub-blocks 0-5 of the block 1204 and sub-blocks 0-5 of the target block 1202. Additionally, the techniques herein also create an entry in the dedupe DB 150 for a data block that has been partially deduplicated.

In this example, with reference to FIG. 13B, partially deduplicating the block 1204 results in creating the entry 1316 in the dedupe DB 150. The example 1350 includes the entries 1310, 1312 and 1314 of FIG. 13A and additionally now includes the entry 1316. The entry 1316 created for the data block 1204 includes the following: D4 in column 1302 where D4 is the calculated digest for entire data block 1204 (e.g., based on all 8 sub-blocks of 1204); the digest key type F speculative in column 1304; a null or no data indicator in the column 1306 denoting no data block is associated with this F speculative entry; and a counter value of 0 in column 1308. The counter 1308 is used for this entry 1316 since the particular digest key type in 1302 is F speculative).

In at least one embodiment in accordance with the techniques herein, the same single field of an entry may be used as either a reference 1306 or a counter 1308 even though they are illustrated as 2 separate fields or columns in this example. In such an embodiment, the same single field is used as the counter 1308 when the digest key type 1304 of an entry is F speculative, and otherwise is used as the reference 1306 when the digest key type is any of the other remaining types described herein.

Subsequently, at a third point in time, the data block 1206 is received for data deduplication processing. Data deduplication processing does not locate a full block match for the block 1206 to an existing target block. However, full block data deduplication processing does determine a match between the digest computed for block 1206 and D4 in the entry 1316. Upon examination of the digest key type as F speculative, the full block data deduplication processing increments the counter 1308 in the entry 1316 from 0 (as in the FIG. 13B) to 1 (as illustrated in the FIG. 14A) to denote a first missed full block deduplication opportunity. If the entry 1316 had otherwise been an F non-speculative entry associated with a target block, the block 1206 would have been fully deduplicated. The element 1402 of the FIG. 14A denotes the changed counter value in column 1308 of entry 1316.

Additionally, with reference to the FIG. 14A, processing may be performed to determine whether the current counter value in the column 1308 for the entry 1316 is less than a specified maximum threshold or limit regarding the maximum number of missed opportunities tracked before performing processing to promote the entry 1316 from an F speculative type entry to an F non-speculative type entry. In other words, the entry 1316 is promoted from an entry associated with a potential target or candidate block having the associated digest of the entry to an entry associated with an actual target block whereby the potential target is now promoted to a new target block associated with the entry 1316 (e.g., where the reference field 1306 identifies a location at which the new target block is stored). In this example, assume the threshold is 2 and processing is performed to determine whether the current counter value of 1 in 1308 for the entry 1316 is less than the threshold of 2. In this example 1400 of the FIG. 14A, the current counter value of 1 (e.g., denoted by the element 1402) is less than the threshold of 2 so processing is not performed to promote the entry 1316 from an F speculative type entry to an F non-speculative type entry.

It should be noted that in at least one embodiment, rather than have 2 separate digest key types of F speculative and F non-speculative, an embodiment may alternatively have a single F digest key type. In such an embodiment, an entry which includes the F digest key type may be implicitly determined as the F speculative digest key type if the reference 1306 of the same entry is null or otherwise identifies a no data indicator; otherwise the entry may be implicitly determined to be the F non-speculative digest key type.

Since full block deduplication processing does not locate a full block match for block 1206 to an existing target block, partial or sub-block deduplication processing is performed as described herein. The partial or sub-block deduplication processing determines a partial block match between sub-blocks 0-5 of the block 1206 and sub-blocks 0-5 of the target block 1202. Thus, FIG. 14A shows entries in the dedupe DB 150 after deduplication processing has been performed for the data blocks 1202 and 1204.

Figure 14B:
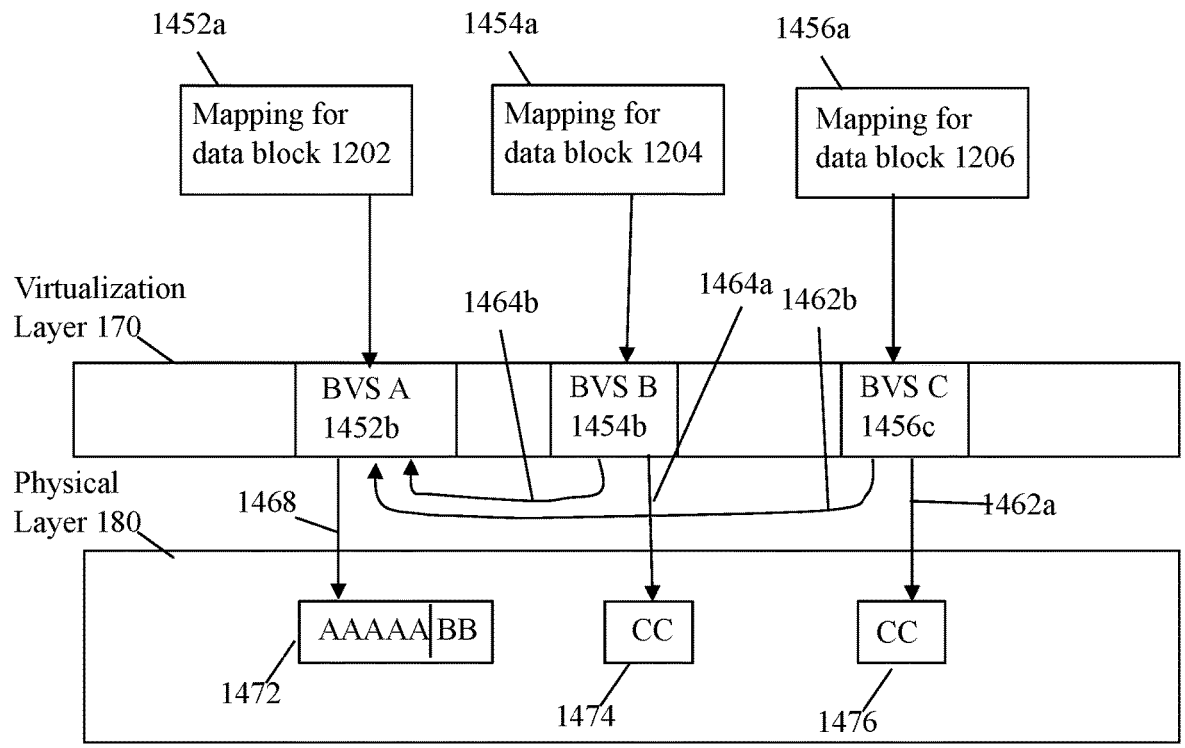

Referring to FIG. 14B, shown is an example illustrating various structures that may be used in an embodiment in accordance with the techniques herein. The example 1450 illustrates structures that may be used to represent the state of the various layers of a system after data deduplication processing has completed for the data blocks 1202, 1204 and 1206 whereby the block 1202 is entered as a new target block and the blocks 1204 and 1206 are partially deduplicated as partially matching target block 1202.

The elements 1452a, 1454a and 1456a denote various structures, such as leaf IB structures, of the mapping layer 160. The mapping structure 1452a provides the mapping for target block 1202 and points to BVS A 1452b located in the virtualization layer 170. The BVS A 1452b identifies, or points 1468, to the physical location or region 1472, in the physical layer 180, at which the content for the block 1202 is stored.

The mapping structure 1454a provides the mapping for the block 1204 and points to BVS B 1454b located in the virtualization layer 170. Since the block 1204 has been partially deduplicated, the BVS B 1454b includes information identifying both the deduplicated portion and also identifying physical storage for the remaining content of the block 1204 that was not deduplicated. The BVS B 1454b identifies, or points 1464b, to the BVS A 1452b used to access the partially deduplicated content of the target block (e.g., sub-blocks 0-5 of the target block 1202 that are identical to sub-blocks 0-5 of the block 1204). Additionally, the BVS A 1452b identifies, or points 1464a, the physical location or region 1474, in the physical layer 180, at which the content for the non-deduplicated sub-blocks 6 and 7 of the block 1204 is stored.

The mapping structure 1456a provides the mapping for the block 1206 and points to BVS C 1456c located in the virtualization layer 170. Since the block 1206 has been partially deduplicated, the BVS C 1456c includes information identifying both the deduplicated portion and also identifying physical storage for the remaining content of the block 1206 that was not deduplicated. The BVS C 1456c identifies, or points 1462b, to the BVS A 1452b used to access the partially deduplicated content of the target block (e.g., sub-blocks 0-5 of the target block 1202 that are identical to sub-blocks 0-5 of the block 1206). Additionally, the BVS C 1456c identifies, or points 1462a, to the physical location or region 1476, in the physical layer 180, at which the content for the non-deduplicated sub-blocks 6 and 7 of the block 1206 is stored.

In the FIG. 14B, additional details (e.g., counters) regarding the various illustrated structures of the layers are omitted for simplicity of illustration. Such additional details are described elsewhere herein (e.g., FIG. 7).

Subsequently, at a fourth point in time with reference to FIG. 14A, the data block 1208 is received for data deduplication processing. Data deduplication processing does not locate a full block match for block 1208 to an existing target block. However, full block data deduplication processing does determine a match between the digest computed for block 1208 and D4 in entry 1316. Upon examination of the digest key type of the entry 1316 as F speculative, the full block data deduplication processing increments the counter 1308 in the entry 1316 from 1 (as illustrated by 1402 in the FIG. 14A) to 2 (as illustrated by 1502 in the FIG. 15) to denote a second missed full block deduplication opportunity. Since the entry 1316 has the digest key type of F speculative in the field or column 1304, no actual deduplication is performed. Rather, the counter 1308 of the entry 1316 is used to count the number of hits or matches between a candidate data block's digest and D3 whereby the counter counts the number of missed full block deduplication opportunities.

At the fourth point in time with reference to the FIG. 15, processing may also be performed to determine whether the current counter value 1308 for the entry 1316 is less than a specified maximum threshold regarding the maximum number of missed opportunities tracked before performing processing to promote the entry 1316 from an F speculative type entry to an F non-speculative type entry. In this example, assume the threshold is 2 and processing is performed to determine whether the current counter value of 2 in 1308 for the entry 1316 is less than the threshold of 2. In this example with reference to FIG. 15, the current counter value of 2 (as illustrated by 1502) is not less than the threshold of 2 so processing is performed to promote the entry 1316 from an F speculative type entry to an F non-speculative type entry.

With reference now to FIG. 16, promoting the entry 1316 from the F speculative type to the F non-speculative type may include storing the entire data block content for the current block 1208 to permanent physical storage (e.g., physical storage of the physical layer 180), updating the reference field 1306 of the entry 1306 (as denoted by 1554) to identify a location of the block 1208 (e.g., which may be stored in cache), and updating the digest key type to F non-speculative (as denoted by 1552). Also, as denoted by 1556, the counter 1308 is not used and is not applicable for the entry 1316 after promotion to an F non-speculative type entry.

In an embodiment in which the digest key type 1304 is coded as "F" without explicit notation of speculative or non-speculative and where a single field is used as both the reference 1306 and counter 1308 (as discussed elsewhere herein), the promotion processing for the entry 1316 may include: storing the entire data block content for the current block 1208 to permanent physical storage (e.g., physical storage of the physical layer 180), and updating the single field used as both the reference 1306 and counter 1308 to identify a location of the block 1208 (e.g., which may be stored in the data cache).

In at least one embodiment, the promotion processing for the entry 1316 may also include creating the entry 1562 in the dedupe DB 150 for the sub-block 0 or L sub-block of the block 1208, and also creating the entry 1564 in the dedupe DB 150 for the sub-block 7 or R sub-block of the block 1208. The entries 1562 and 1564 may be created in a manner similar to that as described above (e.g., steps 980 and 990 of FIG. 9; and also similar to creating entries 1310 and 1312 of FIG. 13A). The entry 1562 is created for the sub-block 0 or the L sub-block of the data block 1208. In the entry 1310: column 1302 includes D5, the calculated digest for the sub-block 0 or the L sub-block of the data block 1208; column 1304 includes the digest key type L; column 1306 includes the reference Ref4 (1208) denoting the location (e.g., cache location) where the contents for sub-block 0 of the data block 1208 is stored; and column 1308 is not in use for this entry (e.g., based on the particular digest key type of L).

The entry 1564 is created for the sub-block 7 or the R sub-block of the data block 1208. In the entry 1564: column 1302 includes D6, the calculated digest for the sub-block 7 or the R sub-block of the data block 1208; column 1304 includes the digest key type R; column 1306 includes the reference Ref4 (1208) denoting the location (e.g., cache location) where the contents for the sub-block 7 of the data block 1208 is stored; and column 1308 is not in use for this entry (e.g., based on the particular digest key type of L).

As a result of the promotion processing of the entry 1316, the associated data block 1208 may be characterized as a new target block that, using entry 1316, may be used in subsequent full block deduplication processing of subsequent data blocks. Additionally, the entries 1562 and 1564 may be used in connection with partial block or sub-block deduplication processing of subsequent data blocks.

Thus, the FIG. 16 may represent entries included in the dedupe DB 150 after deduplication processing for blocks 1202, 1204, 1206 and 1208 has completed and after promotion processing performed for the entry 1316.

In at least one embodiment, processing may be performed to track the particular data blocks which initially trigger creating the F speculative type entry and which have also incremented the counter 1308 associated with the F speculative type entry. In other words, for a particular entry of the dedupe DB 150 that is an F speculative type entry, such processing may track the previously processed data blocks that had a full block digest matching the full block digest of the F speculative type entry of the dedupe DB 150. For example, with reference to the entry 1316, processing may track data blocks 1204, 1206 and 1208. In this manner when the entry 1316 is promoted from the F speculative type to the F non-speculative type, processing may be performed to also convert prior partially deduplicated data blocks 1204 and 1206 to full block deduplicates of the block 1208. In connection with the entry 1316 in this example, such processing may be performed to convert or modify the structures of FIG. 14B for partially deduplicated data blocks 1204 and 1206 to fully deduplicated data blocks 1204 and 1206 as illustrated in FIG. 17.

Figure 17:
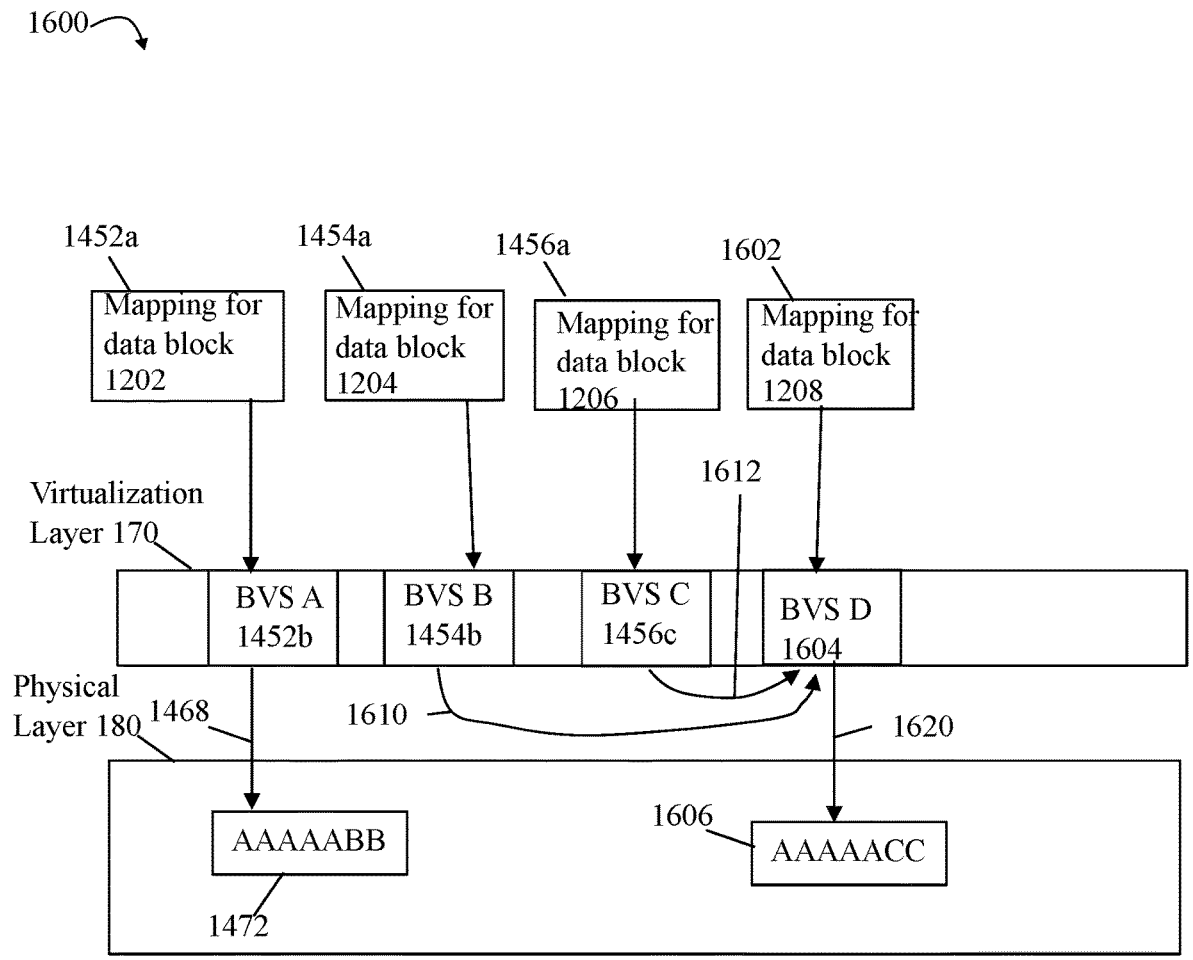

Referring to FIG. 17, shown is an example 1600 illustrating the various structures used in an embodiment in accordance with the techniques herein. The example 1600 illustrates the state of the structures for the blocks 1202, 1204, 1206 and 1208 after the entry 1316 has been promoted to an F non-speculative entry as in FIG. 16 and also after converting the partially deduplicated data blocks 1204 and 1206 to fully deduplicated data blocks 1204 and 1206 (e.g. duplicates of the block 1208). The FIG. 17 includes some similarly numbered elements as in FIG. 14B along with additional elements. The example 1600 includes structures 1452a, 1454a, 1456a, 1452b, 1452b, 1456c and 1472 which are described in connection with FIG. 14B.

The mapping structure 1602 provides the mapping for target block 1208 and points to BVS D 1604 located in the virtualization layer 170. The BVS D 1604 identifies, or points 1620, to the physical location or region 1606, in the physical layer 180, at which the content for the block 1208 is stored. The foregoing for the block 1208 is created as a result of the promotion processing resulting in storing the data block 1208 to persistent storage in connection with promotion processing.

Additionally, the example 1600 illustrates the updated information including pointers, mappings or references between structures as a result of converting the partial deduplication of the blocks 1204 and 1206 to full block deduplicates of the block 1208. For example for the block 1204 having the mapping structure 1454a pointing to BVS B 1454b, the BVS B 1454b is updated indicate that block 1204 has been deduplicated with a full block match to the block 1208 whereby the BVS B 1454b references or points to 1610 BVS D 1604 (e.g., the BVS D 1604 may then be used to access the data content for the block 1208 through pointer 1620 to physical storage 1606). For example for the block 1206 having the mapping structure 1456a pointing to BVS C 1456c, the BVS C 1456c is updated indicate that block 1206 has been deduplicated with a full block match to the block 1208 whereby the BVS C 1456c references or points 1612 to the BVS D 1604 (e.g., the BVS D 1604 may then be used to access the data content for the block 1208 through pointer 1620 to physical storage 1606).

Subsequently, at a fifth point in time, the data block 1210 is received for data deduplication processing. For the block 1210, data deduplication processing locates a full block match to the existing target block 1208. Consistent with discussion herein, the full block match may be determined by comparing the full block digest of block 1210 to digests of entries in the table, where the entries are marked as F non-speculative and F speculative. In this case, processing determines a match between the digest for block 1210 and D4 of entry 1316 (as in FIG. 16). Additionally, a byte-by-byte comparison may be performed between corresponding sub-blocks of the blocks 1208 and 1210 (to account for the possibility of any hash collisions).

Subsequently, at a sixth point in time, the data block 1212 is received for data deduplication processing. For the block 1212, data deduplication processing locates a full block match to the existing target block 1208. Consistent with discussion herein, the full block match may be determined by comparing the full block digest of block 1212 to digests of entries in the table, where the entries are marked as F non-speculative and F speculative. In this case, processing determines a match between the digest for block 1212 and D4 of entry 1316 (as in FIG. 16). Additionally, a byte by byte comparison may be performed between corresponding sub-blocks of the blocks 1208 and 1212 (to account for the possibility of any hash collisions).

Figure 18:
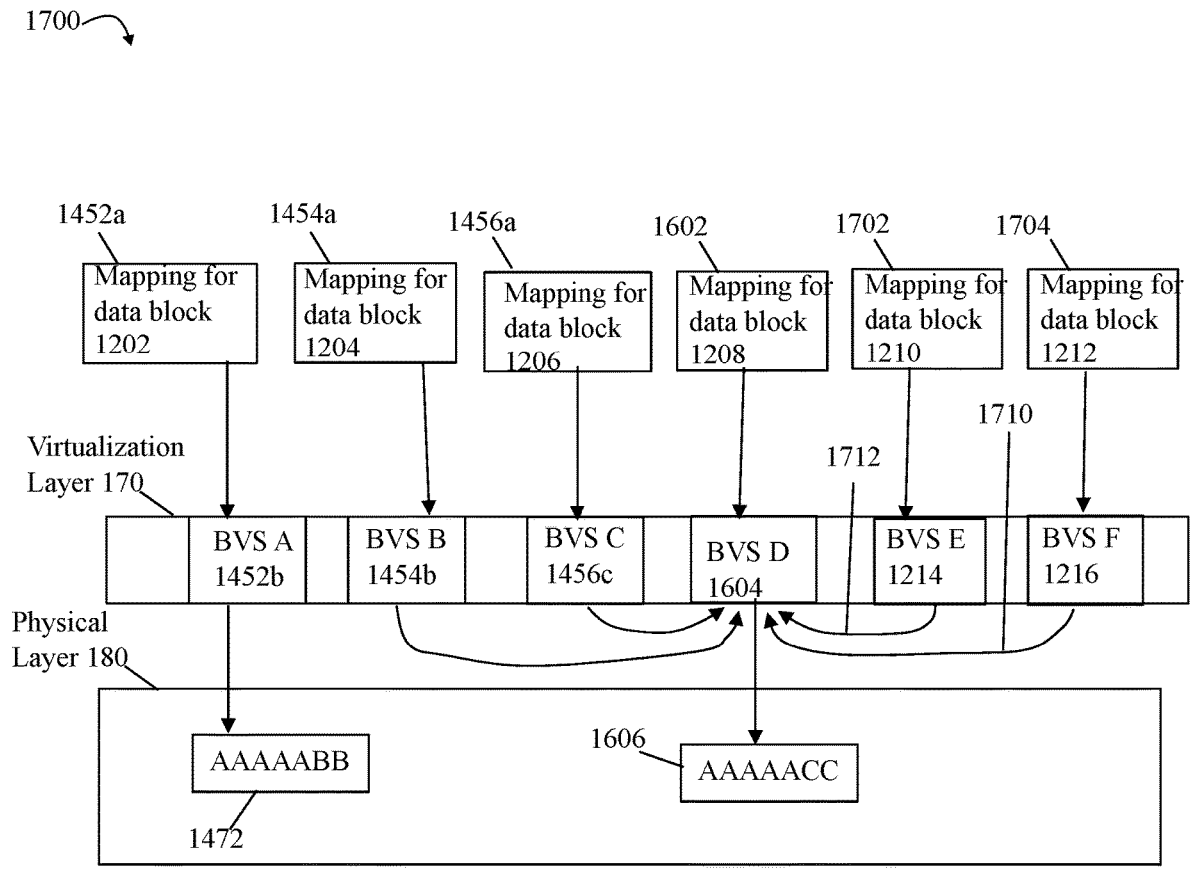

Referring to FIG. 18, shown is an example of the structures that may be used in an embodiment in accordance with the techniques herein. The example 1700 indicates the state of the structures after the sixth point in time and after completing deduplication processing for the data block 1212. The example 1700 reflects an update in the structures previously described in connection with FIG. 17. FIG. 18 includes elements as in FIG. 17 and additionally includes structures and associated information for the subsequent full block deduplication of the blocks 1210 and 1212.

The block 1210 has the mapping structure 1702 that points to the BVS E 1214. The BVS E 1214 indicates that block 1210 has been deduplicated with a full block match to the block 1208 whereby the BVS E 1214 references or points 1712 to BVS D 1604 (e.g., the BVS D 1604 may then be used to access the data content for the block 1208 through pointer 1620 to physical storage 1606).

The block 1210 has the mapping structure 1704 that points to the BVS F 1216. The BVS F 1216 indicates that block 1210 has been deduplicated with a full block match to the block 1208 whereby the BVS F 1216 references or points 1710 to BVS D 1604 (e.g., the BVS D 1604 may then be used to access the data content for the block 1208 through pointer 1620 to physical storage 1606).

What will now be described are flowcharts summarizing processing as described above that may be performed in an embodiment in accordance with the techniques herein.

Figure 19:
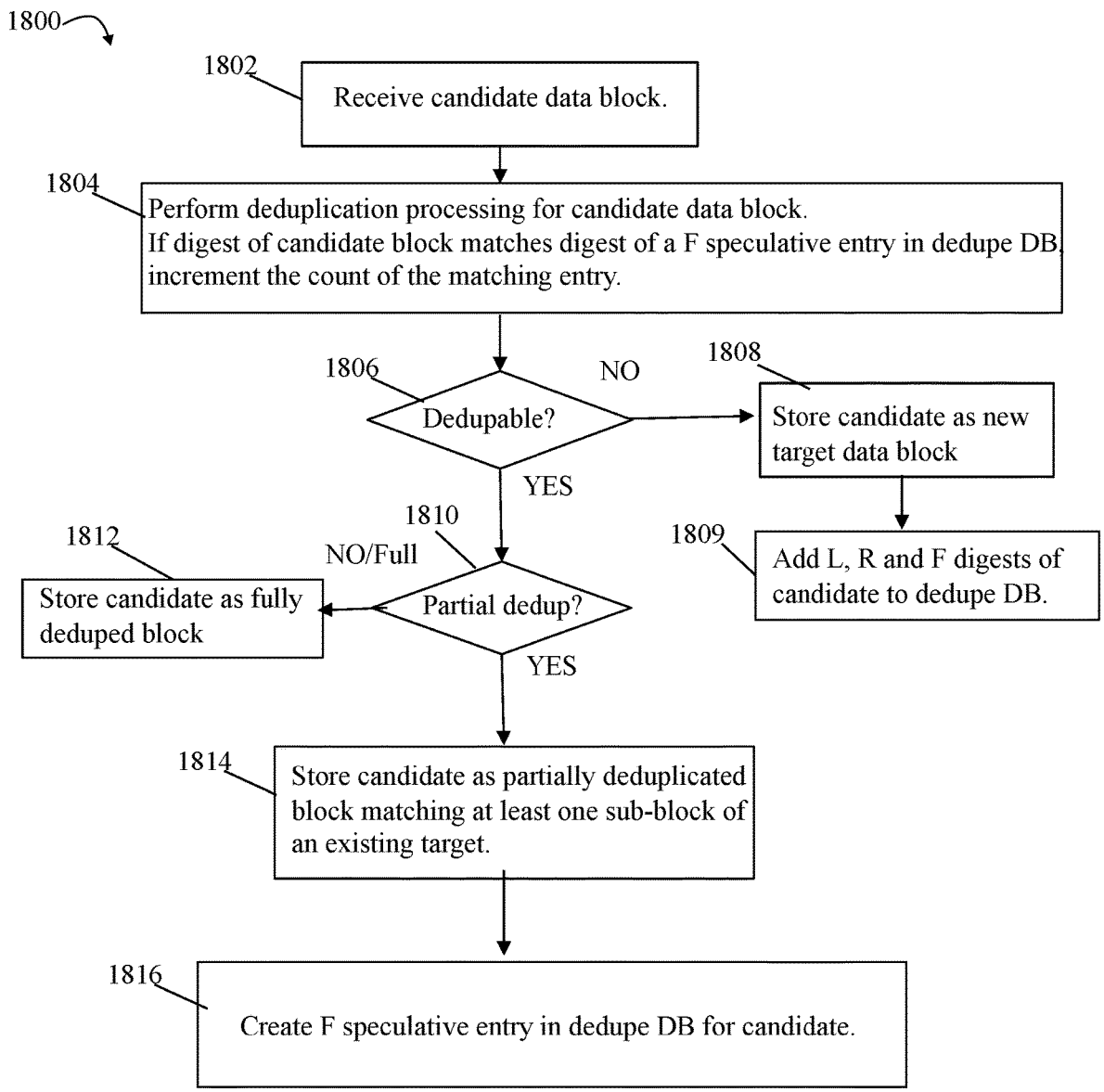
FIGS. 19 and 20 are flowcharts of processing steps that may be performed in an embodiment in accordance with the techniques herein.

Referring to FIG. 19, shown is a first flowchart 1800 of processing steps that may be performed in an embodiment in accordance with the techniques herein. At the step 1802, a candidate data block is received for processing. From the step 1802, processing proceeds to the step 1804. At the step 1804, deduplication processing is performed for the candidate data block. As described herein, the deduplication processing may include full block deduplication processing and determining whether the candidate block matches a target block. If there are no full block matches determined and the candidate cannot be fully deduplicated, the processing of the step 1804 may include performing partial deduplication processing and determining whether at least one sub-block of the candidate matches an existing dedupe target. The step 1804 processing may include incrementing the count of an F speculative entry in the dedupe DB if the digest of the candidate block matches the digest of the F speculative entry in dedupe DB.

From the step 1804, processing proceeds to the step 1806. At the step 1806, a determination is made as to whether the candidate block is dedupable. The step 1806 includes determining whether prior step 1804 found any full target block or partial target block matches for the candidate in the dedupe DB. If the step 1806 evaluates to no, control proceeds to the step 1808 where the candidate is stored as a new target block, as described elsewhere herein. The step 1808 may include, for example, processing as described in connection with the step 990 of the FIG. 9. Depending on the particular embodiment, the step 1808 may include storing the candidate block or sub-blocks of the candidate data block in a compressed form. From step the step 1808, control proceeds to step the step 1809 where digests and associated information of the full candidate data block and the first and last sub-blocks of the candidate are added to the dedupe DB 150 (e.g., add L, R and F digest entries for the candidate to the dedupe DB 150). Step 1809 may include processing, for example, as described in step 980 of FIG. 9.

If the step 1806 evaluates to yes, control proceeds to the step 1810 where a determination is made as to whether the candidate is to be partially deduplicated. If the step 1810 evaluates to no, meaning that the candidate is fully dedupable, then control proceeds to the step 1812 where processing is performed to store the candidate as a full deduplicated block as described elsewhere herein. If the step 1810 evaluates to yes, control proceeds to the step 1814 to store the candidate as a partially deduplicated block matching at least one sub-block of an existing target. The step 1814 may include processing as described herein, for example, such as in connection with the steps 960 and 970 of the FIG. 9. Depending on the particular embodiment, the step 1814 may include storing any unique sub-blocks of the candidate data block in a compressed form. From the step 1814, control proceeds to the step 1816. At the step 1816, processing is performed to create an F speculative entry in the dedupe DB for the candidate block.

Figure 20:
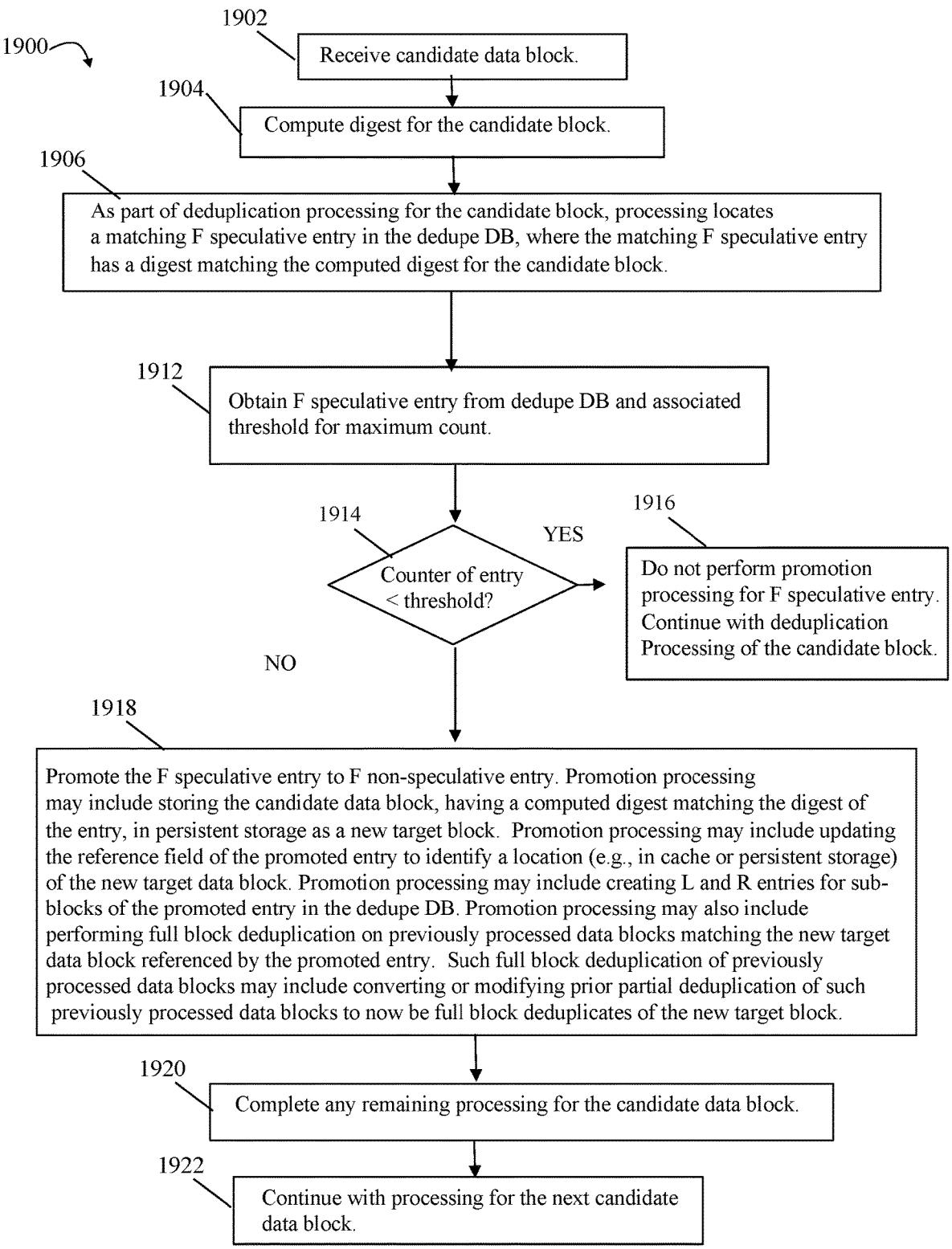

Referring to FIG. 20, shown is a second flowchart 1900 of processing steps that may be performed in an embodiment in accordance with the techniques herein. The second flowchart 1900 may be performed as part of processing for a candidate data block where data deduplication processing performed for the candidate data block results in promoting an existing entry of the dedupe DB, that is an F speculative type, to an F non-speculative type of entry.

At the step 1902, a candidate data block is received. The candidate data block may be, for example, a data block written in connection with a write I/O operation. From the step 1902, control proceeds to the step 1904. Consistent with discussion above and as described in more detail below, the steps 1904 through 1918 may be performed as part of deduplication processing for the candidate data block received in step 1902. In at least one embodiment, the steps 1904 through 1918 may be performed as part of full block deduplication processing for the candidate data block.

At the step 1904, a full block digest is computed for the candidate data block. From the step 1904, control proceeds to the step 1906. At the step 1906, as part of deduplication processing for the candidate block, such as part of full block deduplication processing for the candidate block, processing searches the dedupe DB for a matching full block entry. Data deduplication processing locates a matching F speculative entry in the dedupe DB for the candidate block, where the matching F speculative entry has a digest matching the computed digest for the candidate block.

From the step 1906, control proceeds to the step 1912. At the step 1912, the matching entry from the dedupe DB having the digest key type of F speculative is obtained. Additionally, the step 1912 includes obtaining the associated threshold denoting the limit of missed full block matches allowed for the count for the matching F speculative entry. From the step 1912, control proceeds to the step 1914. At the step 1914, a determination is made as to whether the counter of the F speculative entry is less than the threshold. If the step 1914 evaluates to yes, control proceeds to the step 1916 where promotion processing is not performed for the F speculative entry obtained in step 1912. Deduplication processing of the candidate block continues in the step 1916. From the step 1916, control proceeds to the step 1920.

If the step 1914 evaluates to no, control proceeds to the step 1918 to perform promotion processing to promote the matching F speculative entry of the dedupe DB to an F non-speculative entry. The promotion processing of the step 1918 promotes the matching F speculative entry, currently associated with a potential target or candidate block, to an F non-speculative entry associated with an actual target block whereby the potential target is now promoted to a new target block associated with the F non-speculative entry (e.g., in the F non-speculative entry, the reference field 1306 identifies a location at which the new target block is stored). The promotion processing of the step 1918 may include storing the candidate data block, having a computed digest matching the F type digest of the promoted entry, in persistent storage as a new target data block. The promotion processing of the step 1918 may include updating the reference field of the promoted entry to identify a location (e.g., in cache or persistent storage) of the new target data block (e.g., having the computed digest matching the digest of the promoted entry). The promotion processing of the step 1918 may include creating L and R entries for sub-blocks of the promoted entry in the dedupe DB. The promotion processing may also include performing full block deduplication on previously processed data blocks matching the new target data block associated with the promoted entry. Such full block deduplication of previously processed data blocks may include converting or modifying prior partial deduplication of such previously processed data blocks to now be full block deduplicates of the new target block. From the step 1918, control proceeds to the step 1920.

At the step 1920, any remaining processing may be completed for the candidate data block. From the step 1920, control proceeds to the step 1922. At the step 1922, processing proceeds with the next candidate data block. The step 1922 may include receiving the next candidate block and performing processing as generally described herein, such as, for example, illustrated in FIG. 19.

The techniques herein may be performed by any suitable hardware and/or software. For example, the techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
receiving a first candidate block including a plurality of uniformly-sized sub-blocks;
performing partial deduplication processing of the first candidate block, wherein the partial deduplication processing includes:
partially deduplicating at least one sub-block of the first candidate block; and
creating a first entry in a deduplication database for the first candidate block, wherein the first entry includes a first digest of the first candidate block and the first entry denotes a potential target block having the first digest, and wherein the first entry includes a counter that tracks a number of missed full block deduplications between the potential target block and subsequently processed candidate blocks;
receiving a second candidate block subsequent to performing partial deduplication processing for the first candidate block; and
performing first processing to determine whether to perform promotion processing for the first entry, wherein said promotion processing promotes the potential target block, having the first digest of the first entry, to a new target block.

2. The method of claim 1, further comprising:
determining whether a second digest of the second candidate block matches the first digest of the first entry; and
responsive to determining the second digest of the second candidate block matches the first digest of the first entry, incrementing the counter of the first entry.

3. The method of claim 2, wherein the first processing includes:
  determining whether the counter of the first entry is less than a specified threshold; and
  responsive to determining the counter of the first entry is not less than the specified threshold, performing said promotion processing for the first entry.

4. The method of claim 3, wherein the counter of the first entry is not less than the specified threshold and promotion processing is performed for the first entry, wherein the promotion processing for the first entry includes:
  storing a data block having the first digest on persistent storage; and
  updating a reference field of the first entry to identify a location including content of the data block.

5. The method of claim 4, wherein the location is in a cache.

6. The method of claim 4, wherein the location is in the persistent storage.

7. The method of claim 4, further comprising:
  receiving a third candidate block; and
  performing data deduplication processing for the third candidate block including:
    determining that the third candidate block is a duplicate of the data block having the first digest of the first entry; and
    storing the third candidate block as a duplicate of the data block having the first digest of the first entry.

8. The method of claim 7, wherein the data deduplication processing for the third candidate block includes:
  computing a third digest for the third candidate block;
  comparing the third digest to the first digest of the first entry; and
  determining that the third digest matches the first digest.

9. The method of claim 8, further comprising:
  performing a comparison of data content of the third candidate block and data content of the data block having the first digest of the first entry.

10. The method of claim 4, wherein the second digest of the second candidate block matches the first digest of the first entry and the method includes:
  performing full block deduplication on the second candidate block where the second candidate block is stored as a duplicate of the data block having the first digest of the first entry.

11. The method of claim 1, wherein the method is performed as part of inline processing of one or more data blocks, including the first candidate block and the second candidate block, in connection with an I/O path or data path when servicing one or more I/Os accessing the one or more data blocks.

12. The method of claim 1, wherein the method is performed offline and the method is not performed as part of inline processing of one or more data blocks, including the first candidate block and the second candidate block, in connection with an I/O path or data path when servicing one or more I/Os accessing the one or more data blocks.

13. A system comprising:
  a processor; and
  a memory comprising code stored thereon, that when executed, performs a method of processing data comprising:
    receiving a first candidate block including a plurality of uniformly-sized sub-blocks;
    performing partial deduplication processing of the first candidate block, wherein the partial deduplication processing includes:
      partially deduplicating at least one sub-block of the first candidate block; and
      creating a first entry in a deduplication database for the first candidate block, wherein the first entry includes a first digest of the first candidate block and the first entry denotes a potential target block having the first digest, and wherein the first entry includes a counter that tracks a number of missed full block deduplications between the potential target block and subsequently processed candidate blocks;
    receiving a second candidate block subsequent to performing partial deduplication processing for the first candidate block; and
    performing first processing to determine whether to perform promotion processing for the first entry, wherein said promotion processing promotes the potential target block, having the first digest of the first entry, to a new target block.

14. A computer readable medium comprising code stored thereon that, when executed, performs a method of processing data comprising:
  receiving a first candidate block including a plurality of uniformly-sized sub-blocks;
  performing partial deduplication processing of the first candidate block, wherein the partial deduplication processing includes:
    partially deduplicating at least one sub-block of the first candidate block; and
    creating a first entry in a deduplication database for the first candidate block, wherein the first entry includes a first digest of the first candidate block and the first entry denotes a potential target block having the first digest, and wherein the first entry includes a counter that tracks a number of missed full block deduplications between the potential target block and subsequently processed candidate blocks;
  receiving a second candidate block subsequent to performing partial deduplication processing for the first candidate block; and
  performing first processing to determine whether to perform promotion processing for the first entry, wherein said promotion processing promotes the potential target block, having the first digest of the first entry, to a new target block.

15. The computer readable medium of claim 14, where the method further comprises:
  determining whether a second digest of the second candidate block matches the first digest of the first entry; and
  responsive to determining the second digest of the second candidate block matches the first digest of the first entry, incrementing the counter of the first entry.

16. The computer readable medium of claim 15, wherein the first processing includes:
  determining whether the counter of the first entry is less than a specified threshold; and
  responsive to determining the counter of the first entry is not less than the specified threshold, performing said promotion processing for the first entry.

17. The computer readable medium of claim 15, wherein the counter of the first entry is not less than the specified threshold and promotion processing is performed for the first entry, wherein the promotion processing for the first entry includes:
  storing a data block having the first digest on persistent storage; and updating a reference field of the first entry to identify a location including content of the data block.

18. The computer readable medium of claim 17, wherein the location is in a cache.

19. The computer readable medium of claim 17, wherein the location is in the persistent storage.

20. The computer readable medium of claim 17, wherein the method further comprises:
  receiving a third candidate block;
  performing data deduplication processing for the third candidate block including:
    determining that the third candidate block is a duplicate of the data block having the first digest of the first entry; and
    storing the third candidate block as a duplicate of the data block having the first digest of the first entry.

\* \* \* \* \*